US011621973B2

(12) United States Patent
Mylrea et al.

(10) Patent No.: US 11,621,973 B2
(45) Date of Patent: Apr. 4, 2023

(54) BLOCKCHAIN CYBERSECURITY AUDIT PLATFORM

(71) Applicant: Battelle Memorial Institute, Richland, WA (US)

(72) Inventors: Michael E. Mylrea, Richland, WA (US); Sri Nikhil Gupta Gourisetti, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 435 days.

(21) Appl. No.: 16/503,038

(22) Filed: Jul. 3, 2019

(65) Prior Publication Data
US 2021/0067536 A1     Mar. 4, 2021

(51) Int. Cl.
*H04L 9/40*     (2022.01)
*G06F 16/27*     (2019.01)
(Continued)

(52) U.S. Cl.
CPC ........ *H04L 63/1433* (2013.01); *G05B 19/042* (2013.01); *G06F 8/65* (2013.01);
(Continued)

(58) Field of Classification Search
CPC ... H04L 67/12; H04L 67/1097; H04L 9/3239; H04L 9/3236; H04L 2209/38; G06Q 50/06; G06Q 50/00; Y04S 10/30; Y04S 10/40; Y04S 40/00; Y04S 40/12; H04W 4/70; H04W 4/38
See application file for complete search history.

(56) References Cited

U.S. PATENT DOCUMENTS 10,022,613 B2 *   7/2018   Tran .................... G06Q 20/321
2017/0243290 A1 *   8/2017   Brown .................. G06Q 40/04
(Continued)

OTHER PUBLICATIONS

Abeyratne et al., "Blockchain Ready Manufacturing Supply Chain Using Distributed Ledger," *Int'l Journal of Research in Engineering and Technology*, vol. 5, No. 9, 11 pp. (Sep. 2016).
(Continued)

*Primary Examiner* — Tae K Kim
(74) *Attorney, Agent, or Firm* — Klarquist Sparkman, LLP

(57) ABSTRACT

A cybersecurity distributed ledger is provided herein for managing, tracking, auditing, and securing assets in a power infrastructure. The cybersecurity distributed ledger may include a blockchain, and may combine with smart contract or smart negotiation technology, such as in a permissioned proof of authority blockchain. The cybersecurity distributed ledger may manage the complete life cycle of a grid asset, from asset requirement and specification, through production, testing, deployment, maintenance, and retirement. The cybersecurity distributed ledger may create an immutable record of the grid asset, which may be audited for regulatory compliance or build or development compliance. Further, the cybersecurity distributed ledger may store unique identifying information for a grid asset, which may be used to detect a security breach or other tampering with a grid asset. The cybersecurity distributed ledger may also track control or ownership of the grid asset, as well as changes or updates to the grid asset.

19 Claims, 16 Drawing Sheets

(51) Int. Cl.

| | |
|---|---|
| *G06F 21/60* | (2013.01) |
| *H04L 9/06* | (2006.01) |
| *G05B 19/042* | (2006.01) |
| *G06F 8/65* | (2018.01) |
| *H04L 9/00* | (2022.01) |

(52) U.S. Cl.
CPC ............ *G06F 16/27* (2019.01); *G06F 21/602* (2013.01); *H04L 9/0637* (2013.01); *H04L 9/0643* (2013.01); *G05B 2219/2639* (2013.01); *H04L 9/50* (2022.05)

(56) References Cited

U.S. PATENT DOCUMENTS

| | | | | |
|---|---|---|---|---|
| 2017/0358041 | A1* | 12/2017 | Forbes, Jr. | B60L 53/64 |
| 2018/0089436 | A1* | 3/2018 | Smith | H04L 9/3236 |
| 2018/0144114 | A1* | 5/2018 | Fiske | G06F 21/32 |
| 2018/0165660 | A1* | 6/2018 | High | G06Q 50/06 |
| 2018/0272886 | A1* | 9/2018 | Stöcker | B60L 53/305 |
| 2018/0299852 | A1* | 10/2018 | Orsini | G05B 19/042 |
| 2019/0043050 | A1* | 2/2019 | Smith | G06Q 20/401 |
| 2019/0050949 | A1* | 2/2019 | Orsini | H02J 3/381 |
| 2019/0102837 | A1* | 4/2019 | Smith | G06Q 20/223 |
| 2019/0102850 | A1* | 4/2019 | Wheeler | G06Q 20/405 |
| 2019/0123580 | A1* | 4/2019 | Bindea | H02J 13/00028 |
| 2019/0139159 | A1* | 5/2019 | Sarker | G06Q 50/06 |
| 2019/0140849 | A1* | 5/2019 | Kravitz | H04W 12/08 |
| 2019/0163912 | A1* | 5/2019 | Kumar | H04L 41/08 |
| 2019/0164236 | A1* | 5/2019 | Mayne | G06Q 20/389 |
| 2019/0172159 | A1* | 6/2019 | Sun | G06Q 30/018 |
| 2019/0279210 | A1* | 9/2019 | Pen | G06Q 20/38215 |
| 2019/0318425 | A1* | 10/2019 | Tilley | G06Q 20/223 |
| 2019/0340269 | A1* | 11/2019 | Biernat | H04L 9/50 |
| 2019/0353685 | A1* | 11/2019 | Almeida Cavoto | G06Q 20/145 |
| 2019/0353709 | A1* | 11/2019 | Kaisers | G01R 31/392 |
| 2019/0363890 | A1* | 11/2019 | Johnson | H04L 9/0891 |
| 2019/0393722 | A1* | 12/2019 | Stöcker | H02J 13/00034 |
| 2020/0005264 | A1* | 1/2020 | Patterson | G06Q 50/06 |
| 2020/0028360 | A1* | 1/2020 | Heintel | H04L 9/3239 |
| 2020/0036225 | A1* | 1/2020 | Kolling | H02J 3/466 |
| 2020/0051186 | A1* | 2/2020 | Sarker | G07F 15/003 |
| 2020/0067696 | A1* | 2/2020 | Sarin | G06F 21/64 |
| 2020/0076891 | A1* | 3/2020 | Stuart | H04L 67/12 |
| 2020/0084202 | A1* | 3/2020 | Smith | H04L 41/5003 |
| 2020/0326679 | A1* | 10/2020 | Maher | H02J 3/144 |
| 2020/0366493 | A1* | 11/2020 | Sood | H04L 9/3239 |

OTHER PUBLICATIONS

Apte et al., "Will blockchain technology revolutionize excipient supply chain management?" *Journal of Excipients and Food Chemicals*, pp. 76-78 (Sep. 2016).

Buldas et al., "Keyless Signatures' Infrastructure: How to Build Global Distributed Hash-Trees," *Secure IT systems: 18th Nordic Conference*, 9 pp. (2013).

Chantz, "Weather, wither, whether: How blockchain enables precision agriculture," *IBM Blockchain Blog*, 8 pp. (May 2018).

Deetman, "Bitcoin Could Consume as Much Electricity as Denmark by 2020," *Motherboard Tech by Vice*, 20 pp. (Mar. 2016).

Detwiler, "One nation's move to increase food safety with blockchain," *IBM Blockchain Blog*, 1 pp. (Feb. 2018).

Dudley, "Security, food safety and cognitive with blockchain," *IBM Blockchain Blog*, 7 pp. (Oct. 2016).

Hern, "Bitcoin mining consumes more electricity a year than Ireland," *The Guardian*, 4 pp. (Nov. 2017).

Kim et al., "Toward an Ontology-Driven Blockchain Design for Supply Chain Provenance," *Intelligent Systems in Accounting, Finance and Management*, 18 pp. (Aug. 2016).

Lowry, "Top learnings about blockchain for supply chain at Distributed: Trade," *IBM Blockchain Blog*, 8 pp. (Aug. 2017).

McDermott, "Improving confidence in food safety with IBM Blockchain," *IBM Blockchain Blog*, 8 pp. (Sep. 2017).

Mylrea et al., "Blockchain: A Path to Grid Modernization and Cyber Resiliency," *IEEE North American Power Symposium*, 5 pp. (2016).

Mylrea et ak, "Blockchain for Smart Grid Resilience: Exchanging Distributed Energy at Speed, Scale and Security," *IEEE Resilience Week*, pp. 18-23 (2016).

Mylrea et al., "Keyless Signature Blockchain Infrastructure: Facilitating NERC CIP Compliance and Responding to Evolving Cyber Threats and Vulnerabilities to Energy Infrastructure," *IEEE Pes Transmission & Distri. Conference & Exposition*, 5 pp. (2017).

NERC CIP., "CIP-010-1—Cyber Security—Configuration Change Management and Vulnerability Assessments," 34N pp. (Nov. 2013).

North /American Transmission Forum, "NATF CIP-013-1 Implementation Guidance," Version 2.0, 11 pp. (Apr. 2019).

POA Network, "Proof of Authority: consensus model with Identity of Stake," *Medium*, 5 pp. (Nov. 2017).

Pradhan et al., "Supply Chains Are Racing to Understand Blockchain—What Chief Supply Chain Officers Need to Know," *Gartner Research*, 2 pp. (Nov. 2017).

Pyrzenski, "I'll only eat blockchain cereal with a food safety label on the box," *IBM Blockchain Blog*, 8 pp. (Sep. 2017).

Quartz, "Walmart wants to bring blockchain technology to the food business," 1 p. (downloaded on Jan. 24, 2020).

Ramamurthy, "Leveraging blockchain to improve food supply chain traceability," *IBM Blockchain Blog*, 7 pp. (Nov. 2016).

Tapscott et al., "Blockchain Revolution: How the Technology Behind Bitcoin is Changing Money, Business, and the World," *Portfolio*, 324 pp. (2016).

Tian, "An Agri-food Supply Chain Traceability System for China Based on RFID & Blockchain Technology," *13th Int'l Conf. on Service Systems and Service Management*, 6 pp. (2016).

Trottier, "original-bitcoin," Github, 1p. (Apr. 2013).

Unuvar, "Blockchain and food safety at the CGF Global Summit," *IBM Blockchain Blog*, 8 pp. (May 2017).

Unuvar, "The food industry gets an upgrade with blockchain," *IBM Blockchain: Blockchain Unleashed*, 9 pp. (Jun. 2017).

Walch, "The Path of the Blockchain Lexicon (and the Law)" *Review of Banking & Financial Law*, vol. 36, pp. 713-765 (2016-2017).

Mylrea et al., "Blockchain for Supply Chain Cybersecurity, Optimization and Compliance," *2018 Resilience Week (RWS)*, pp. 70-76 (Aug. 20-23, 2018).

Mylrea et al., "Blockchain: Next Generation Supply Chain Security for Energy Infrastructure and NERC Critical Infrastructure Protection (CIP) Compliance," *Systemics, Cybernetics and Informatics*, 16:22-30 (2018).

\* cited by examiner

BLOCKCHAIN CYBERSECURITY AUDIT PLATFORM

ACKNOWLEDGMENT OF GOVERNMENT SUPPORT

This invention was made with Government support under Contract DE-AC05-76RL01830 awarded by the U.S. Department of Energy. The Government has certain rights in the invention.

BACKGROUND

The energy industry and electrical grid are important components of modern life, and are under increasing threat of cyberattacks. Such threats may target both the software and hardware installed in the electrical grid, as well as the supply chain for the energy industry. However, with the large number of entities involved in the industry and the supply chain, enacting effective security can be difficult. Further, security can often be considered second to other considerations in the industry, such as functionality or cost. Regulations attempt to address this issue, but compliance assessments, audits, and risk management are often manual, making them prohibitively expensive, time-consuming, and inaccurate, especially across an entire software and hardware supply chain. Such difficult-to-measure regulatory compliance can lead to a false sense of security, reduced revenues, and resource challenges. Accordingly, there is great room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of securing an electrical grid asset is provided herein. From a distributed ledger, a cryptographically-signed first record having a unique identifier for the electrical grid asset may be provided. The unique identifier may be based at least in part on metadata defining the electrical grid asset. A cryptographically-signed data cluster having additional metadata describing the electrical grid asset and/or status of the electrical grid asset may be received. The cryptographically-signed data cluster may be confirmed. A second record may be stored in the distributed ledger in association with the first record. The second record may be based at least in part on hashing of the cryptographically-signed data cluster and the cryptographically-signed first record.

A method of securely updating an electrical grid asset is also provided herein. A signed cryptographically-secured current data cluster having a unique identifier for the electrical grid asset and asset version data may be provided. A signed cryptographically-secured updated data cluster having the unique identifier for the electrical grid asset and updated asset version data may be received. The signed cryptographically-secured updated data cluster may be received. The signed cryptographically-secured updated data cluster may be inserted into a distributed ledger having the current data cluster.

A method of performing distributed ledger operations for critical infrastructure systems is also provided herein. A unique identifier for an electrical grid asset may be registered in a distributed ledger. A first asset record may be generated. The first asset record may include the unique identifier and a description of the electrical grid asset. The first asset record may be stored in an asset record chain in the distributed ledger. Production data for the electrical grid asset may be received. A second asset record may be generated based at least in part on the unique identifier and the production data. The second asset record may be stored in the asset record chain in the distributed ledger. Manufacturing data for the electrical grid asset may be received. A third asset record may be generated based at least in part on the unique identifier and the manufacturing data. The third asset record may be stored in the asset record chain in the distributed ledger. A fourth asset record may be generated in the asset record chain based at least in part on the unique identifier, the first asset record, the second asset record, and the third asset record. The fourth asset record may be stored in the asset record chain in the distributed ledger.

The foregoing and other objects, features, and advantages of the invention will become more apparent from the following detailed description, which proceeds with reference to the accompanying figures.

DETAILED DESCRIPTION

Example 1—Power Infrastructure Cybersecurity Overview

Figure 1A:
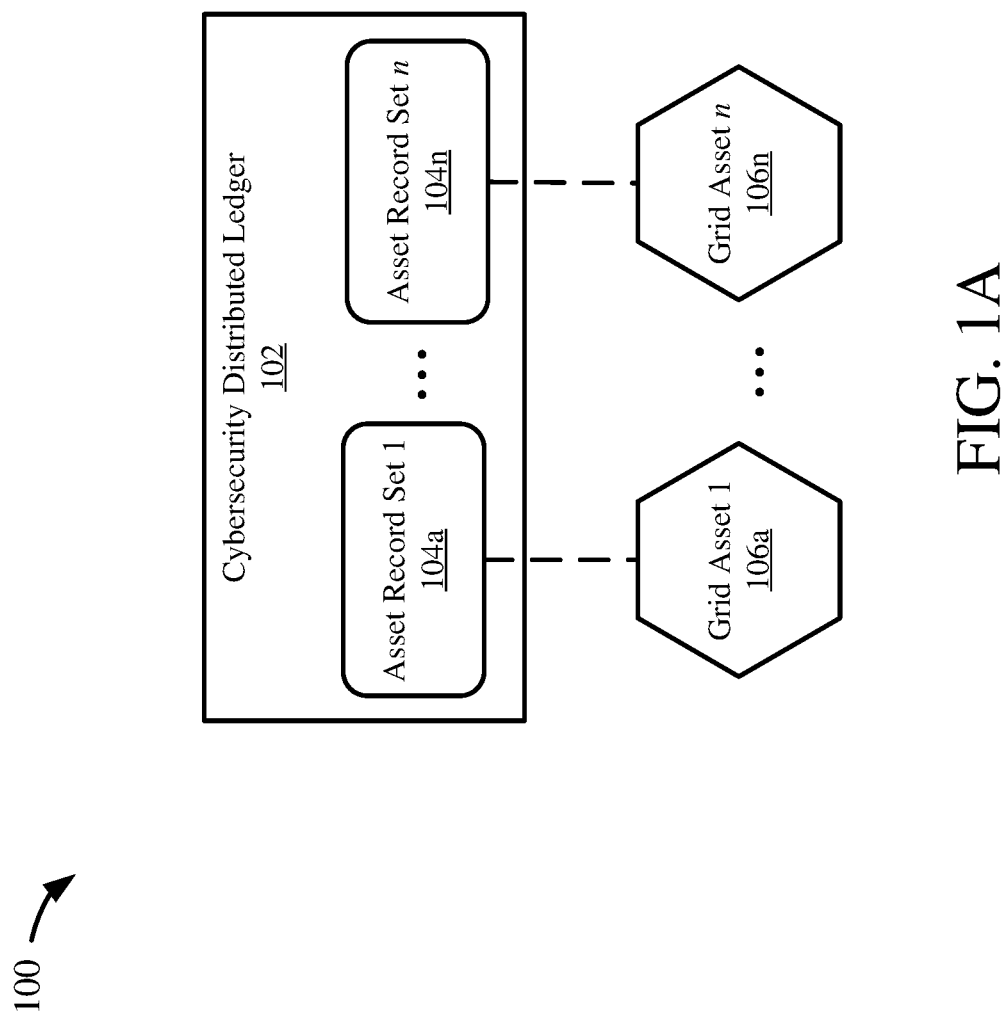
FIG. 1A is an architecture diagram depicting a distributed ledger system for securing and tracking energy grid assets.

The increasing number of cyberattacks against critical infrastructure systems, such as electrical grids or other grid systems, including the electrical grid supply chain or other critical infrastructure supply chains, warrants increased security along the grid. Such attacks have also spurred an increase in regulation and regulatory compliance. Recent decisions by the Federal Energy Regulatory Commission (FERC) directed the North American Electric Reliability Corporation (NERC) to address cybersecurity supply chain risk management for ICS hardware, software, and computing and networking services associated with Bulk Electric System (BES) operations. The FERC order incentivizes energy utilities and vendors to consider cybersecurity as part of their value propositions. Accordingly, energy/utility suppliers or originators are may now look increasingly towards 1) software integrity and authenticity, 2) vendor remote access, 3) information system planning, and 4) vendor risk management and procurement controls. Utility suppliers or originators are now more responsible for controls for managing cybersecurity risks to BES Cyber Systems during the planning, acquisition, and deployment phases of the system (e.g. electrical grid asset) life cycle. Compliance with securing the electrical grid is moving to the forefront of considerations for utilities.

However, the current NERC compliance process (CIP) is resource intensive, largely manual, costly, burdensome with complex periodic assessments, and often ineffective in securing the increasing number of networked field devices. Moreover, current security controls, like whitelisting and laborious physical inventories and monitoring of critical cyber assets, are challenging due, in part, to the increasing number of Internet-connected (IoT) devices in the grid. Not only does this increase the attack surface, but daily fines for NERC CIP noncompliance can quickly become very costly once detected.

The blockchain cybersecurity audit platform (BCAP) technology as described herein can alleviate and help resolve such problems with critical infrastructure systems (e.g. grid systems). The BCAP may include blockchain or other distributed ledger technology, which can cryptographically sign the transactions (e.g. the "who," "what," "when," and "where") for grid assets for a portion up to their entire chain of custody, from the factory to deployment in the field, including monitoring the integrity of the devices when deployed, and to retirement. Instead of periodic laborious compliance and security CIP assessments, both regulators and utilities could use the BCAP technology disclosed herein to facilitate monitoring and securing of complex energy environments and the grid assets in them. Such distributed ledger and blockchain technologies that could be used to implement BCAP may include, but are not limited to, Ethereum™, Linux Foundation Hyperledger™ technologies, AWS Blockchain™ as a service technologies, or any other blockchain technology. Such distributed ledger and blockchain technologies may work without any cryptocurrency or, alternatively, may work with a cryptocurrency.

Generally, the BCAP may store records of a grid asset through the grid asset's lifecycle, from assessment and planning of the asset requirements and specification, to manufacturing and acquisition, to deployment or installation, through operation and maintenance, and to asset retirement or replacement. As the records are generally immutable records in a distributed ledger, a clean and auditable and trackable record in the BCAP is thus readily available to a broad range of parties (e.g. the utility or owner, vendors, suppliers, auditor, regulators, investigators, etc.). Further, the data stored for a grid asset in the BCAP may include information unique to the grid asset, thus allowing comparison between the actual asset and the record, which may facilitate determination of security breach or other tampering of the asset. The BCAP may also assist in software, patch, and/or configuration management (or combination thereof).

The records in the BCAP may be signed data clusters, signed data clusters of data clusters, a sequence of signed data clusters, or nested signed data clusters. The signed data clusters (e.g. records) may store both the history of the asset, such as including previous records for the grid asset, and the proof of registration of the asset that shows its association with the BCAP and the asset's record set in the BCAP. Thus, the asset's records can be independently verified and the authenticity of the record validated.

The BCAP technology can increase transparency and auditability of the grid system throughout the manufacturing, shipping, deployment, maintenance, and retirement life cycle. BCAP's chain of custody and monitoring of field devices are provisioned and tracked in the blockchain through their entire life cycle, and may enforce multilayered access control mechanisms through secure data clusters. BCAP can generally provide an immutable archived record (e.g. set of records or blocks) about the firmware, hardware, and software components of the grid system (and other critical infrastructure systems), which may include the past and current patch management information. Such transaction records and asset metadata can be widely witnessed through a cryptographic hash of their metadata, captured in an immutable blockchain record (instead of a single server that can be manipulated or erased). Further, BCAP can expedite and enhance inter-vendor/supplier cooperative system development through increased visibility and accessibility of supply chain data through the BCAP.

BCAP's architecture generally can help ensure data integrity throughout the chain of custody by verifying the identity of the signer of a transaction and alerting if the data in a transaction has been manipulated. A cryptographically signed hash of the transaction data can be captured as a block, or record, in the distributed ledger. The regulator returns a signature token to see the information about the asset at each route along the supply chain (e.g., vendor, supply, utility). In the context of NERC CIP compliance, the hash would be sent to the regulator along with chain-of-custody data and device logs, which could potentially help verify everything from machine state integrity to software version and patch information using the hash calendar on the blockchain. Sending the logs and machine state separately may increase the availability and security of the data to the wide variety of parties involved (e.g. utilities, vendors, suppliers, auditors, or others that need record access). Further, the BCAP's architecture can help ensure data confidentiality throughout the manufacturing process, such as by securing data within a signed cluster and controlling access.

In some example implementations, the BCAP also has the following benefits which may improve cyber risk management and regulatory compliance: 1) BCAP's chain of custody and monitoring of field devices are generally provisioned and tracked in the blockchain through their entire life cycle, thus facilitating increased transparency and auditability of the system throughout the manufacturing, shipping, deployment and maintenance, and retirement life cycle of a grid asset; 2) BCAP generally provides an immutable archived record about the firmware, hardware, and software components of the system including the past and current patch management information, which can be widely witnessed through a cryptographic hash of their metadata captured in an immutable blockchain (instead of a single server, for example, that can be manipulated or erased); 3) BCAP generally expedites and enhances inter-vendor cooperative system development through increased visibility and accessibility of supply chain data; 4) BCAP generally improves security of the supply chain process through increased trustworthiness and integrity of data through a blockchain consensus mechanism, which can reduce reliance on, and can even replace, the need for intermediary trust mechanisms and brokers. Thus, the need for some third-party vendors, EDS, or other field devices might be reduced as blockchain enables more trustworthy peer-to-peer transactions that are less susceptible to manipulation and compromise; 5) BCAP generally enables principle component traceability throughout the asset lifecycle to incorporate efficient systems engineering processes; and 6) improved audibility and monitoring of critical cyber assets, which facilitates compliance and improves the security of devices (e.g. grid assets). The blockchain consensus algorithm could flag if a field device was not patched and may help deny a malicious change in the configuration of a field device, thus maintaining machine state integrity by default.

Example 2—BCAP as a Cybersecurity Distributed Ledger of Cyber and Physical Assets FIG. 1A is an architecture diagram 100 depicting a distributed ledger system 102 for securing and tracking electrical grid assets 106a-n. The BCAP may include or otherwise use a cybersecurity distributed ledger 102. The cybersecurity distributed ledger 102 may include or otherwise use a blockchain or other distributed ledger system (for example, the BCAP may be built around blockchain technology, which may be of various types). The cybersecurity distributed ledger 102 may have one or more asset record sets 104a-n, which may be sets of immutable or otherwise secured records.

An asset record set, such as asset record set 1 104a, may include one or more records associated together. For example, the records may be blocks in a blockchain, or otherwise signed data clusters (or clusters of clusters). A record may have a hash of its preceding record, and thereby be associated with the preceding record, as the hash may uniquely identify the preceding record. A first record in the record set 104a-n may be a genesis record, having no preceding record. The records in a record set 104a-n may be immutable, and may be individually cryptographically signed and hashed, such as in a blockchain. The cryptographic signature may identify the entity that initiated generation of the record. A record may include a timestamp for the record, and may further include a unique identifier for a grid asset associated with the record or the record set 104a-n. Each record in a record set 104a-n may store updated or additional data (or both) compared to the previous record in the record set. In this way, the record set 104a-n may act as an auditable history of its stored data.

A record set 104a-n may be associated with a grid asset 106a-n, such that generally a given record set is associated with a given grid asset. For example, asset record set 1 104a may be associated with grid asset 1 106a. A record set 104a-n may store data or metadata about its associated grid asset 106a-n. A record set 104a-n may include records storing data or metadata for the associated grid asset 106a-n such as asset requirements (e.g. asset functionality), asset or product specification, asset validation or verification (e.g. testing) data, software data, firmware data, hardware data, deployment data, lifecycle or patch data, or other transaction data for the asset.

A grid asset 106a-n may be a product, component, part, or other piece of (or be used in conjunction with) an energy or electrical grid infrastructure, including software components, firmware components, or hardware components. In some cases, a grid asset 106a-n may be a combination of components, such as a hardware component with firmware (or firmware and software). In other cases, a grid asset 106a-n may be a single component, such as software or hardware.

The asset record set 104a-n may have records storing transaction data for its associated grid asset 106a-n. For example, a transaction record may be generated in the asset record set 104a-n when a grid asset 106a-n advances through its lifecycle, such as when it is produced, or is transferred from a supplier to a vendor, tested, installed or deployed, etc. Such transaction records 104a-n may maintain metadata about the grid asset 106a-n, such as data that may be used to uniquely identify the grid asset or about the status of the grid asset at the transaction.

A grid asset 106a-n may have a unique identifier which may be used to associate the grid asset with its asset record set 104a-n. The unique identifier may be available with or on the grid asset itself 106a-n. For example, the unique identifier may be a QR code which may be printed on the grid asset 106a-n if the asset is a physical asset, or be accessible through software for digital grid assets. As additional examples, the unique identifier may be an RFID, a software checksum, a MAC address, or the like. The unique identifier may be used, along with other asset metadata, to compute a hash and that hash may be stored in the cybersecurity distributed ledger. Such a unique identifier may be entered into the cybersecurity distributed ledger 102 to access the asset record set 104a-n for the corresponding grid asset 106a-n. In some embodiments, the unique identifier may be generated or assigned by the cybersecurity distributed ledger 102.

Figure 1B:
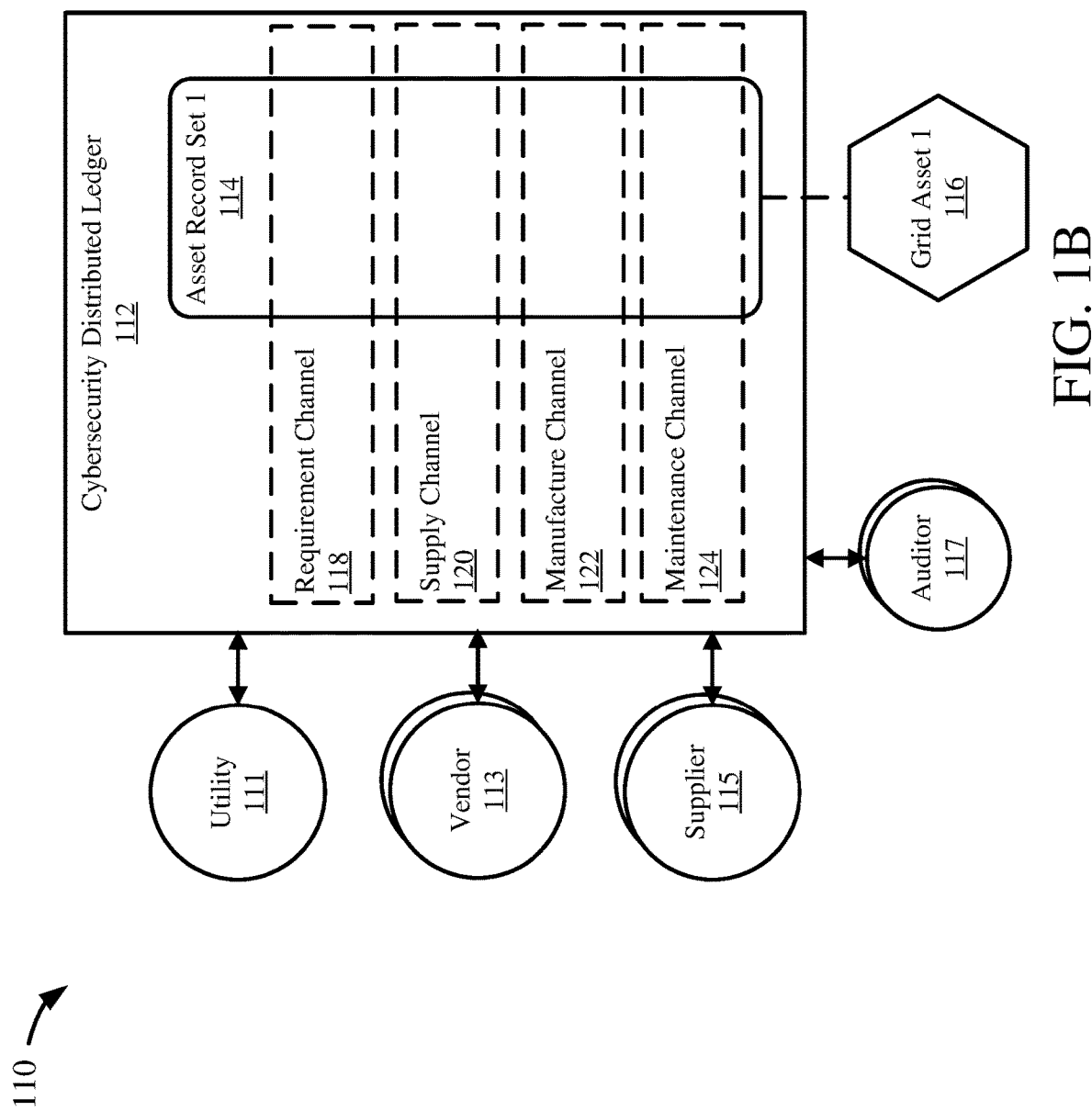
FIG. 1B is an architecture diagram depicting a distributed ledger system for securing and tracking energy grid assets with channels and nodes.

FIG. 1B is an architecture diagram depicting a cybersecurity distributed ledger system 112 with channels and nodes. The cybersecurity distributed ledger 112 may be similar to the cybersecurity ledger 102 shown in FIG. 1A. The asset record set 1 114 be similar to the asset record sets 104a-n and the grid asset 1 116 may be similar to the grid assets 106a-n shown in FIG. 1A.

The cybersecurity distributed ledger 112 may be accessed by one or more nodes 111, 113, 115, 117 which may represent different entities. The entities may be different actors in the life cycle of the grid asset 116. The nodes 111, 113, 115, 117 may host or partially host some or all of the cybersecurity distributed ledger 112. The entities, via their nodes, 111, 113, 115, 117 may have unique signatures for cryptographically signing asset records in the asset record set 114 for a grid asset 116. In this way, each record representing a transaction for the grid asset 116 in the asset record set 114 may be attributed to a particular entity (e.g. via its node) 111, 113, 115, 117.

A utility 111 may access the cybersecurity distributed ledger 112 as the owner or requestor of the grid asset 116. One or more utilities may access the cybersecurity distributed ledger 112, but generally a single grid asset will be associated with (e.g. owned by or requested by) a single utility. One or more vendors 113 may access the cybersecurity distributed ledger 112 as the vendor or manufacturer of the grid asset 116. One or more suppliers 115 may access the cybersecurity distributed ledger 112 as suppliers, or developers or producers, of the grid asset 116 or components or parts of the grid asset. One or more auditors 117 may access the cybersecurity distributed ledger 112 to audit or otherwise investigate an asset record set 114 for a grid asset 116, such as to assess regulatory compliance for a grid asset 116 or analyze a possible breach of an electrical grid via the grid asset.

The cybersecurity distributed ledger 112 may have one or more channels 118, 120, 122, 124 which may represent stages of the lifecycle for a grid asset 116. The channels may include groups of records, in a record set 114, representing transactions between different entities 111, 113, 115, 117 for the grid asset 116. The cybersecurity distributed ledger 112 may have a requirement channel 118, a supply channel 120, a manufacturing channel 122, and a maintenance channel 124.

The requirement channel 118 may generally include records, in the record set 114, for transactions between a utility 111 and one or more potential vendors 113 for a requested grid asset (e.g. grid asset 1 116). A utility 111 may generate a record having a set of asset requirements which may be accessed by one or more vendors 113 in the requirement channel 118 of the cybersecurity distributed ledger 112. The vendors 113 may generate respective records having bidding information, such as cost or delivery timeline, for providing the requested grid asset in the requirement channel 118. The negotiations (e.g. transactions or communications) between the utility 111 and the one or more vendors 113 may be recorded in the asset record set 114 of the cybersecurity ledger 112; these records in aggregate may form the requirement channel 118. In this way, the requirements channel 118 may represent the stored records of the negotiations for provisioning the grid asset 116. Generally, the requirements channel 118 encapsulates and records the negotiation for a grid asset 116 between a utility 111 and one or more vendors 113, resulting in a recorded set of asset requirements (e.g. product specification) and a selected vendor to provide the grid asset (and other provision information, such as cost or timeline).

The supply channel 120 may generally include records, in the record set 114, for transactions between a vendor 113 (e.g. as determined in the requirement channel 118) and one or more potential suppliers 115 for a requested grid asset or components of a grid asset (e.g. grid asset 1 116). A vendor 113 may generate a record having a set of asset requirements and supply requirements which may be accessed by one or more suppliers 115 in the supply channel 120 of the cybersecurity distributed ledger 112. The suppliers 115 may generate respective records having bidding information, such as cost or delivery timeline, for providing the requested grid asset or grid asset components in the supply channel 120. The negotiations (e.g. transactions or communications) between the vendor 113 and the one or more suppliers 115 may be recorded in the asset record set 114 of the cybersecurity ledger 112; these records in aggregate may form the supply channel 120. In this way, the supply channel 120 may represent the stored records of the negotiations for supplying the grid asset 116 or grid asset components. Generally, the supply channel 120 encapsulates and records the negotiation for supplying one or more components of a grid asset 116 between a vendor 113 and one or more suppliers 115, resulting in a recorded set of asset components and their requirements (e.g. product specification) attributed to respective one or more selected suppliers to provide the grid asset components (and other supply information, such as cost or timeline).

The manufacture channel 122 may generally include records, in the record set 114, for transactions recording component development and testing of the grid asset 116. A supplier 115 may generate a record having production data, or testing data or both, for a component of the grid asset 116, which may be accessed by the vendor 113 or the utility 111 in the manufacture channel 122 of the cybersecurity distributed ledger 112. A vendor 113 may also generate a record having production data, or testing data or both, for the grid asset 116, which may be accessed by the utility 111 in the manufacture channel 122 of the cybersecurity distributed ledger 112. Generally, as a component of the grid asset 116 or the grid asset itself is completed and passed to the next entity 111, 113, 115 in the supply chain, a record of the transaction may be generated in the manufacture channel 122 of the cybersecurity distributed ledger 112. Such records may include production data or verification/validation data (or both) for the grid asset 116 or a component of the grid asset. Such production data may identify a particular build, whether of the hardware, firmware, or software, and may include identifying compliance with a requirement or other specification or regulation. In this way, the manufacture channel 122 may represent the stored records of the manufacturing or development of the grid asset 116 and the grid asset components. Generally, the manufacture channel 122 encapsulates and records the manufacturing, development, and testing of one or more components of a grid asset 116 and the grid asset in total by a vendor 113 and the one or more suppliers 115, resulting in a recorded set of asset components and their state or status (e.g. product specification) attributed to the vendor or suppliers that manufactured the grid asset components or grid asset (and other manufacture or provisioning information, such as expended cost or actual timeline).

The maintenance channel 124 may generally include records, in the record set 114, for transactions recording component maintenance and testing of the grid asset 116. Component maintenance may include patch development or part repair. A supplier 115 may generate a record having maintenance data, or testing data or both, for a component of the grid asset 116, which may be accessed by the vendor 113 or the utility 111 in the maintenance channel 124 of the cybersecurity distributed ledger 112. A vendor 113 may also generate a record having maintenance data, or testing data or both, for the grid asset 116, which may be accessed by the utility 111 in the maintenance channel 122 of the cybersecurity distributed ledger 112. Generally, as maintenance on a component of the grid asset 116 or the grid asset itself is completed and the grid asset or component thereof is passed to the next entity 111, 113, 115 in the supply chain, a record of the transaction may be generated in the maintenance channel 124 of the cybersecurity distributed ledger 112. Such records may include maintenance data or verification/validation data (or both) for the grid asset 116 or a component of the grid asset. Such maintenance data may identify a particular build of a software or firmware patch or part repair, whether of the hardware, firmware, or software, and may include identifying compliance with a requirement or other specification or regulation. In this way, the maintenance channel 124 may represent the stored records of the maintenance or versioning of the grid asset 116 and the grid asset components. Generally, the maintenance channel 124 encapsulates and records the updating, repairing, and testing of one or more components of a grid asset 116 and the grid asset in total by a vendor 113 and the one or more suppliers 115, resulting in a recorded set of asset components and their state or status (e.g. product specification) attributed to the vendor or suppliers that patched or otherwise maintained the grid asset components or grid asset (and other maintenance, repair, or update information, such as expended cost or actual timeline, or compatibility).

Generally, records in an asset record set 114 are associated across the channels 118, 120, 122, 124. Thus, the set or chain of records 114 for an asset 116 can be completely accessible without separation between channels 118, 120, 122, 124. In some embodiments, the records in a particular channel 118, 120, 122, 124 may have an indicator of the channel, such as in a channel field in the record.

One or more auditors 117 may also access the cybersecurity distributed ledger 112. The auditors may be a third party, such as an investigator, compliance specialist, or regulator, which may access the distributed ledger 112 to analyze and review the records 114 for a grid asset 116. Regulatory compliance may be determined by reviewing the asset record set 114 for a grid asset 116. Further, analyzing the grid asset itself 116 against its asset record set 114 may provide insight into the security of the grid asset. For example, comparing part or component information from the grid asset 116 against the part or component information in its asset record set 114 may indicate if the grid asset has been tampered with or otherwise altered if the information does not match. For example, the checksum of software installed on a grid asset 116 may be compared against the recorded checksum of the software in the asset record set 114; differences between the checksums may indicate a cybersecurity breach of the grid asset. Another example of verifying the integrity may include computing the hash of the asset (e.g. based on data from the asset) and checking if the hash matches with the hash stored on the cybersecurity distributed ledger. A match indicates the asset has not been breached (e.g. integrity has been maintained), while a mismatch indicates the asset or asset information may have been manipulated or otherwise breached.

The channels 118, 120, 122, 124 may have defined access controls in the cybersecurity distributed ledger 112. For example, requirement channel 118 may have requirement channel access controls, which may be separate controls from supply channel access controls for the supply channel 120. In some embodiments, the access controls may overlap or be co-extensive. Such access controls may limit access to their respective channels 118, 120, 122, 124 such that authorized or respective participants 111, 113, 115, 117, per channel, can access the channel or the records from the cybersecurity distributed ledger 112 that are related to that channel. Thus, in some embodiments, not all of the participants 111, 113, 115, 117 can access all of the channels. Access controls may be enforced at multiple levels, such as: read only, write only, read and write, no access, full access (read, write, and change), or the like. Through such channel-based system with access controls, BCAP can enforce confidentiality. In some embodiments, channel access controls may be incorporated into other cybersecurity distributed ledger 112 permissions, such as in a permissioned blockchain as described herein.

Example 3—Cybersecurity Distributed Ledger Network

Figure 1C:
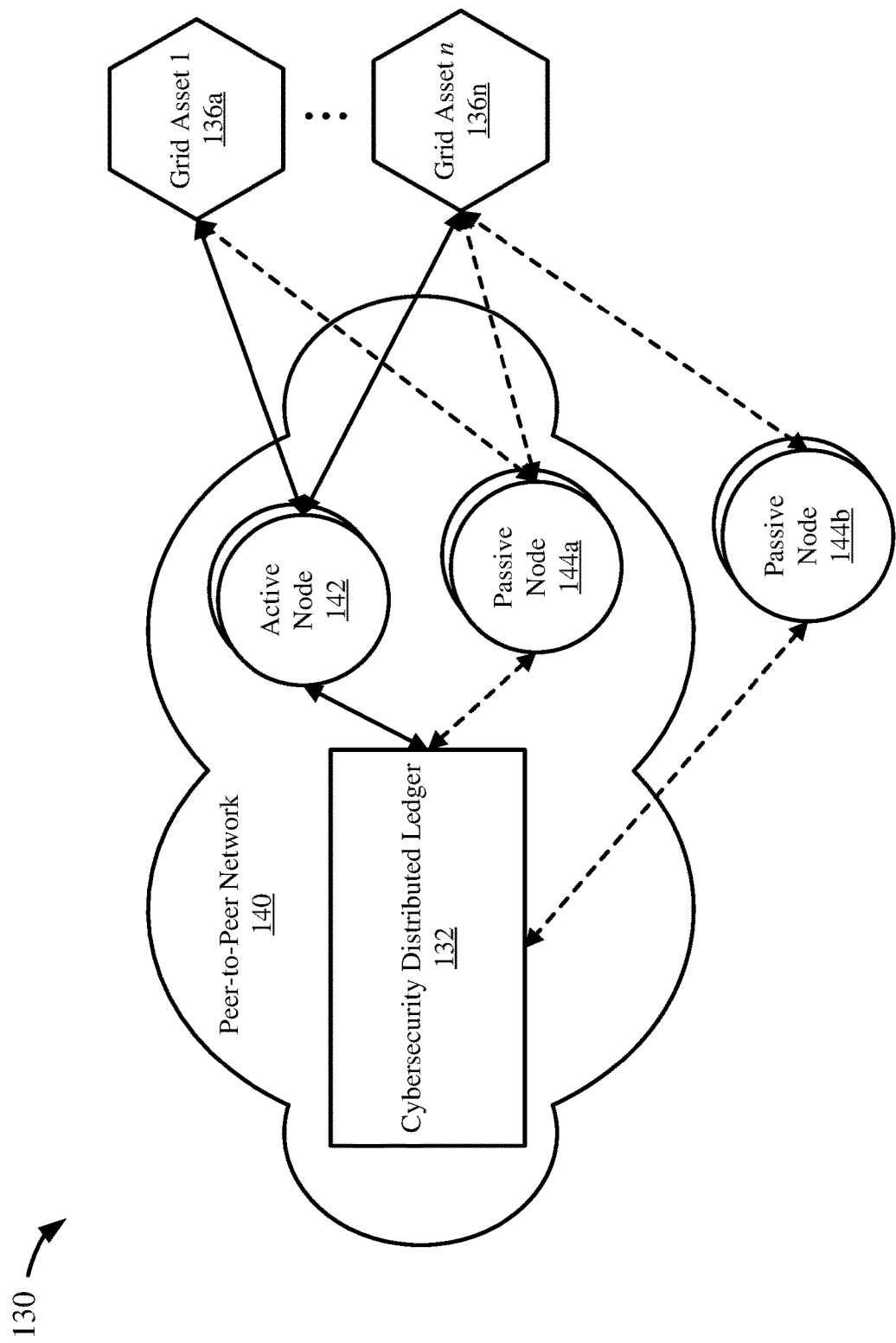
FIG. 1C is an architecture diagram depicting a distributed ledger system in a network.

FIG. 1C is an architecture diagram 130 depicting a cybersecurity distributed ledger system 132 on a peer-to-peer network 140. The cybersecurity distributed ledger 132 may be hosted or otherwise maintained or provided on a peer-to-peer network 140, which may be a distributed network having multiple network nodes 142, 144a. The network nodes 142, 144a may be managed, maintained, or otherwise represent the cybersecurity distributed ledger users, utilities 111, vendors 113, suppliers 115, and auditors 117, shown in FIG. 1B. For example, a vendor may be represented by a node 142, 144a on the peer-to-peer network 140 hosting the cybersecurity distributed ledger 132.

The peer-to-peer network 140 may have active nodes 142. Active nodes 142 may be nodes (or users or hosts of the nodes) that may generate records in the cybersecurity distributed ledger 132, and may perform other actions in the cybersecurity distributed ledger, such as record validation or consensus. Generally, active nodes 142 may include nodes for utilities, vendors, and suppliers, as described herein. In some cases, auditors may also be represented by active nodes 142 in the network 140. Users of active nodes 142 (e.g. utilities, vendors) may access or otherwise perform actions on the grid assets 136a-n, which may then be recorded in the cybersecurity distributed ledger 132 via an active node 142 for the respective entity.

The peer-to-peer network 140 may have passive nodes 144a. Passive nodes 144a may be nodes (or users or hosts of the nodes) that may read records in the cybersecurity distributed ledger 132, but generally do not perform other actions. Generally, passive nodes 144a may include nodes for auditors or other third parties, as described herein. In some cases, passive nodes 144b may be outside the peer-to-peer network 140, but may still have access to the cybersecurity distributed ledger 132. Users of passive nodes 144a, 144b (e.g. auditors) may access or otherwise obtain data from the grid assets 136a-n, which may then be compared against data for the respective grid asset obtained from the cybersecurity distributed ledger 132.

In some embodiments, the peer-to-peer network 140 may be a private network, such as a network maintained by a utility, or may be a hybrid network.

Example 4—Permissioned Proof of Authority BCAP

The BCAP may be implemented as a permissioned proof of authority (PoA) blockchain. For example, the cybersecurity distributed ledger 132 shown in FIG. 1C may include, or may be a component of, a permissioned PoA blockchain, and the nodes 142, 144a-b may be permissioned nodes on the network 140. Permissioned PoA blockchains generally do not rely on a single party and provide widely witnessed evidence to its records. Such blockchains can perform validation of data while retaining confidentiality from the outside network; for example, only permissioned nodes can see, communicate, or validate transactions. Proof of authority blockchains can also scale to industrial applications at high speeds. Availability and functionality of scale without prohibitive latency is valuable for use in the power grid and other critical processes performed by operational technology such as industrial control and energy delivery systems.

A permissioned PoA blockchain may allow nodes to take actions based on the permissions for that node, and may further require proof of authority to take the action. Further, the permissions may be granted action by action. Thus, a node (e.g. a user) may have permission to perform one action, such as a read action, while not having permission to take another action, such as an update or add record action. A node with permission to take action may be an active node, as described herein, while a node without permission for that action may be a passive node. Alternatively or additionally, an active node may have write permissions, while a passive node may only have read privileges.

Further, permissioned PoA blockchains may facilitate smart contracts or smart negotiations. Smart contracts may allow for the execution of digital code which results in various transactions within defined perimeters. These executions of complex transactions can take place over the blockchain and be recorded over the distributed ledger. Smart contracts could also help automate supply chain security through dynamic patch management alerts and updates, role-based access controls and baselining and monitoring machine state integrity. Once a smart contract is initialized on the blockchain, it may have an address associated with it. That address can be used to interact with the smart contract. That smart contract may be present in the form of bytecode on the blockchain. The blockchain may provide an atomically verifiable cryptographic signed distributed ledger, which provides a unique way of distributing trust. For example, instead of storing supply chain data such as inventory of critical hardware or time, date of patch for critical software, critical supply chain data may be stored in the distributed escrow of the blockchain, which maintains time stamped data blocks that cannot be modified retroactively, which increases the trustworthiness and integrity of the data. Several proof of authority blockchain technologies enable secure communications from operational technology protocols and industrial control systems by including an advanced cryptographic signature that assigns the time of signing and data signer to a data asset, as well as authentication.

The BCAP may alternatively or additionally be implemented using other proofs or voting-based consensus.

Example 5—BCAP Requirement Channel Records

Figure 2A:
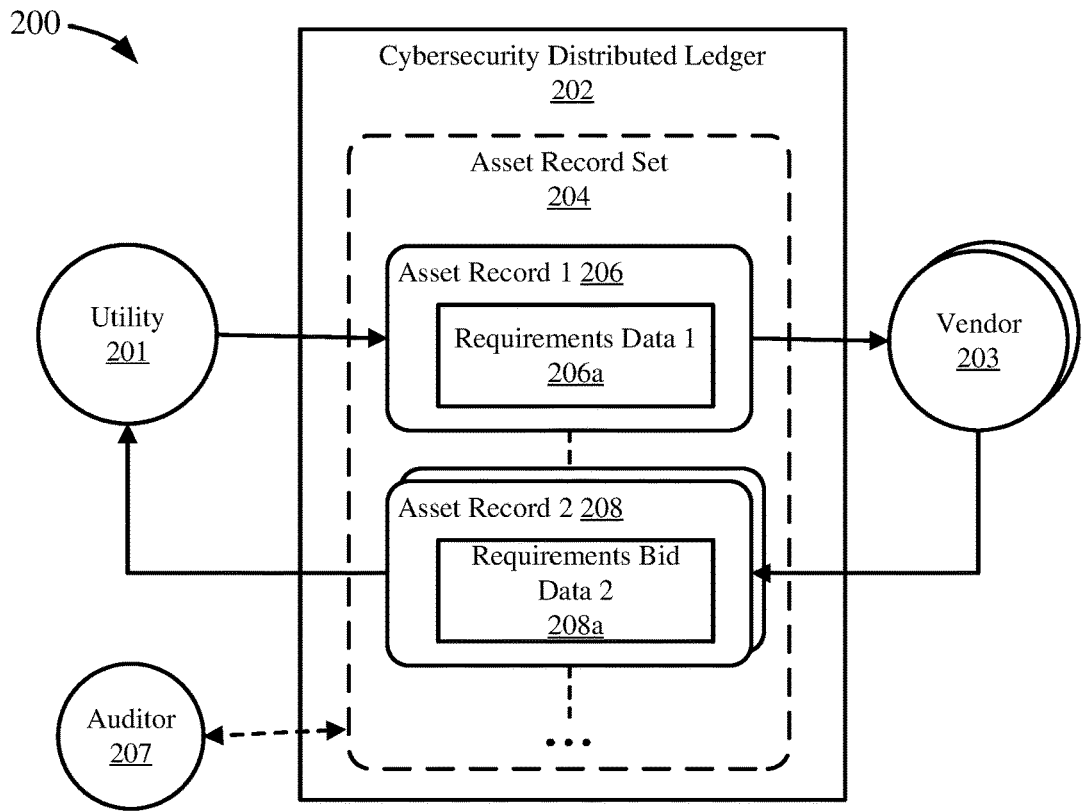
FIG. 2A is a flow diagram depicting a record set generated in a requirement channel of a cybersecurity distributed ledger.

FIG. 2A is a flow diagram 200 depicting a record set 204 generated in a requirement channel of a cybersecurity distributed ledger 202. An asset record 1 206 may be generated by (e.g. at the request of) a utility 201 and stored in the cybersecurity distributed ledger 202. The asset record 206 may be generated by the cybersecurity distributed ledger 202 in an asset record set 204 for a grid asset. The asset records 206, 208 in an asset record set 204 may be linked together, and may be stored sequentially (e.g. such as based on time of insertion, or time of creation/generation) in the asset record set. The asset record 206 may include a unique identifier for its associated grid asset, as defined herein. The asset record 206 may be cryptographically signed by the utility 201, and may contain a timestamp and a hash of the preceding record in the asset record set, thereby linking the records. If there is no preceding record in the record set 204 for the grid asset, the asset record 1 206 may be a genesis record, or the first record for the record set. The asset record 206 may be cryptographically hashed. Generally, the asset record 206 may be a block in blockchain (e.g. the cybersecurity distributed ledger).

The asset record 206 may further contain requirements data 1 206a. The requirements data 206a may be transaction data between the utility 201 and one or more vendors 203. For example, the requirements data 206a may be a bid solicitation for manufacturing or procuring a grid asset by a vendor 203. The requirements data 206a may be specification information for a grid asset, providing functionality requirements, such as hardware specification and firmware or software requirements. The requirements data 206a may also include logistics information, such as cost or delivery date or timeline.

Similar to the asset record 206, a next asset record 208 may be generated by (e.g. at the request of) a vendor 203. The asset record 208 may be generated by the cybersecurity distributed ledger 208 in the asset record set 204 for the grid asset, and may include the unique identifier for its associated grid asset. The asset record 208 may be cryptographically signed by the vendor 203 which initiated the record, and may contain a timestamp and a hash of the preceding record 206 in the asset record set, thereby linking the records 206, 208. The asset record 208 may be similarly cryptographically hashed. Generally, the asset record 208 may be a block in blockchain (e.g. the cybersecurity distributed ledger).

Alternatively or additionally, transactions in a given time period may be combined into an asset record 206, 208. Such a combined asset record may be asset record 206 or asset record 208, or may be a combination of asset records generated during the given time period, such as an additional asset record having all asset records (e.g. 206, 208) generated during the given time period.

The asset record 208 may further contain requirements bid data 2 208a. The requirements bid data 208a may be transaction data between a vendor 203 and the utility 201. For example, the requirements bid data 208a may be a tender in response to the bid solicitation in record 206 for manufacturing or procuring a grid asset by the vendor 203 which signed the record 208. The requirements bid data 208a may include confirmation of specification information for a grid asset, and may also include logistics information, such as proposed cost or delivery date or timeline.

Multiple vendors 203 may separately generate similar records as to record 208, with their own respective requirements bid data 208a. These separate records from separate vendors 203 are generally each associated with the preceding record 206 in the asset record set 204. Through a consensus process, such as by selection of the utility 201, the next record in the record set 204 may be determined. The other asset records generated by other vendors may then become orphan records. In this way, a vendor for manufacturing or otherwise provisioning the grid asset may be selected, with an auditable record of the selection process and requirements. This smart contract or smart negotiation process (or other negotiation process) may be repeated multiple times, as needed to reach an agreement between the utility 201 and a vendor 203 on the grid asset requirements and provisioning logistics. Such transactional processes (e.g. negotiations) may be accomplished with human-in-the-loop, off-chain applications, on-chain applications, and/or smart contracts, and may be repeated multiple times.

The asset record set 204 in the cybersecurity distributed ledger 202 may be accessed and reviewed by an auditor 207, or other third party, at any point in the smart contract process.

Example 6—BCAP Supply Channel Records

Figure 2B:
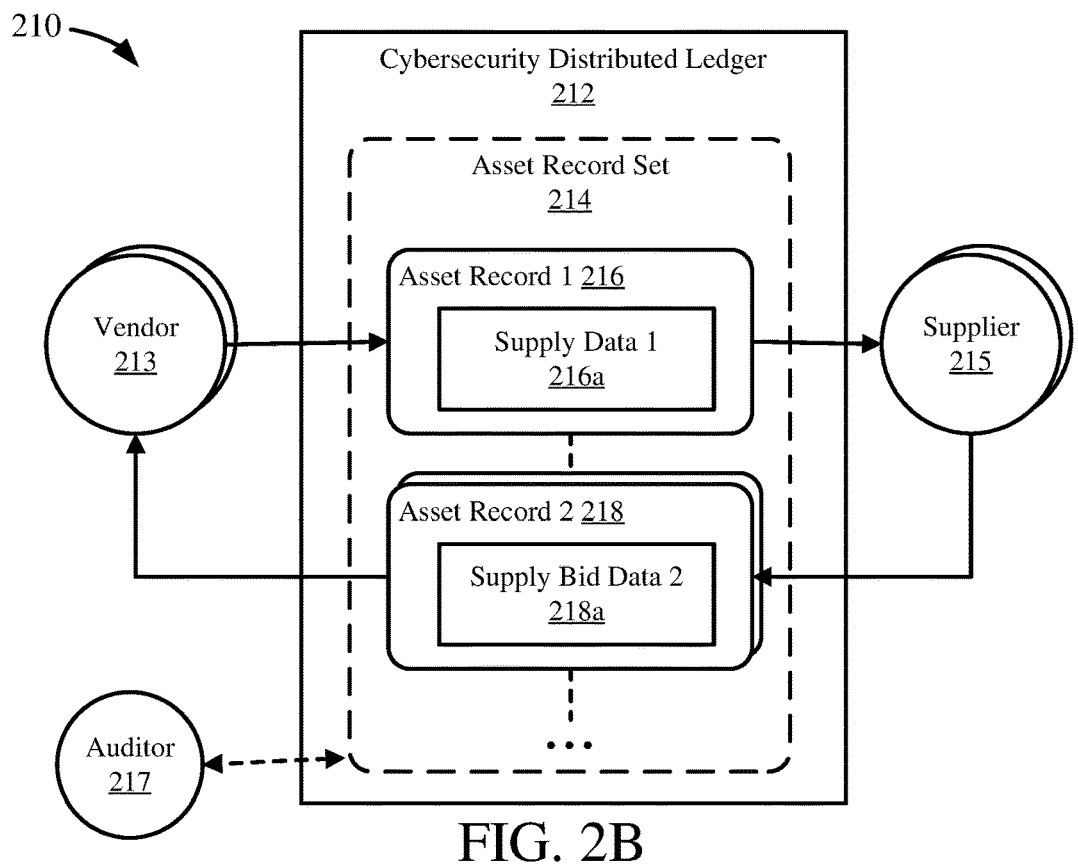
FIG. 2B is a flow diagram depicting a record set generated in a supply channel of a cybersecurity distributed ledger.

FIG. 2B is a flow diagram 210 depicting a record set 214 generated in a supply channel of a cybersecurity distributed ledger 212, as similarly shown in FIG. 2A. An asset record 1 216 may be generated by (e.g. at the request of) a vendor 203 and stored in the cybersecurity distributed ledger 212. The vendor 213 may be a vendor determined based at least in part on the asset records in the requirement channel (e.g. vendor 203), as in, the vendor selected by the utility 201, shown in FIG. 2A, to manufacture or procure the grid asset.

The asset record 216 may be generated by the cybersecurity distributed ledger 212 in an asset record set 214 for a grid asset, as similar described and shown in FIG. 2A. The asset records 216, 218 in an asset record set 214 may be linked together, and may be stored sequentially (e.g. such as based on time of insertion, or time of creation/generation) in the asset record set. The asset record 216 may include a unique identifier for its associated grid asset, as defined herein. The asset record 216 may be cryptographically signed by the vendor 203, and may contain a timestamp and a hash of the preceding record in the asset record set, thereby linking the records. If there is no preceding record in the record set 204 for the grid asset, the asset record 1 216 may be a genesis record, or the first record for the record set. The asset record 216 may be cryptographically hashed. Generally, the asset record 216 may be a block in blockchain (e.g. the cybersecurity distributed ledger).

Alternatively or additionally, transactions in a given time period may be combined into an asset record 216, 218. Such a combined asset record may be asset record 216 or asset record 218, or may be a combination of asset records generated during the given time period, such as an additional asset record having all asset records (e.g. 216, 218) generated during the given time period.

The asset record 216 may further contain supply data 1 216a. The supply data 216a may be transaction data between a vendor 213 and one or more suppliers 215. For example, the supply data 216a may be a bid solicitation for manufacturing or procuring a component or other part of a grid asset by a supplier 215. The supply data 216a may be specification information for a grid asset or a part of a grid asset, providing functionality requirements, such as hardware specification and firmware or software requirements. The supply data 216a may also include logistics information, such as cost or delivery date or timeline.

The supply data 216a may be similar to the requirements data 206a shown in FIG. 2A, but be from a vendor 213 to one or more suppliers 215. In this way, the supply data 216a may be a subset of the requirements data 206a, or detail manufacture or provisioning of a portion of the requirements data.

Similar to the asset record 216, a next asset record 218 may be generated by (e.g. at the request of) a supplier 215. The asset record 218 may be generated by the cybersecurity distributed ledger 218 in the asset record set 214 for the grid asset, and may include the unique identifier for its associated grid asset. The asset record 218 may be cryptographically signed by the supplier 215 which initiated the record, and may contain a timestamp and a hash of the preceding record 216 in the asset record set, thereby linking the records 216, 218. The asset record 218 may be similarly cryptographically hashed. Generally, the asset record 218 may be a block in blockchain (e.g. the cybersecurity distributed ledger).

The asset record 218 may further contain supply bid data 2 218a. The supply bid data 218a may be transaction data between a supplier 215 and a vendor 213. For example, the supply bid data 218a may be a tender in response to the bid solicitation in record 216 for manufacturing or procuring a component of the grid asset by the supplier 215 which signed the record 218. The supply bid data 218a may include confirmation of specification information for a grid asset component, and may also include logistics information, such as proposed cost or delivery date or timeline.

Multiple suppliers may separately generate similar records as to record 218, with their own respective supply bid data 218a. These separate records from separate suppliers 215 are generally each associated with the preceding record 216 in the asset record set 214. Through a consensus process, such as by selection of the vendor 213 which signed the record 216, the next record in the record set 214 may be determined. The other asset records generated by other suppliers may then become orphan records. In this way, a supplier for manufacturing or otherwise provisioning a component of the grid asset may be selected, with an auditable record of the selection process and requirements, similar to the process between the utility 201 and the vendors 203 shown in FIG. 2A. This smart contract or smart negotiation process (or other negotiation process) may be repeated multiple times, as needed to reach an agreement between the vendor 213 and one or more suppliers 215 on the grid asset requirements and provisioning logistics. Such transactional processes (e.g. negotiations) may be accomplished with human-in-the-loop, off-chain applications, on-chain applications, and/or smart contracts, and may be repeated multiple times.

The asset record set 214 in the cybersecurity distributed ledger 212 may be accessed and reviewed by an auditor 217, or other third party, at any point in the smart contract process.

Example 7—BCAP Manufacture Channel Records

Figure 2C:
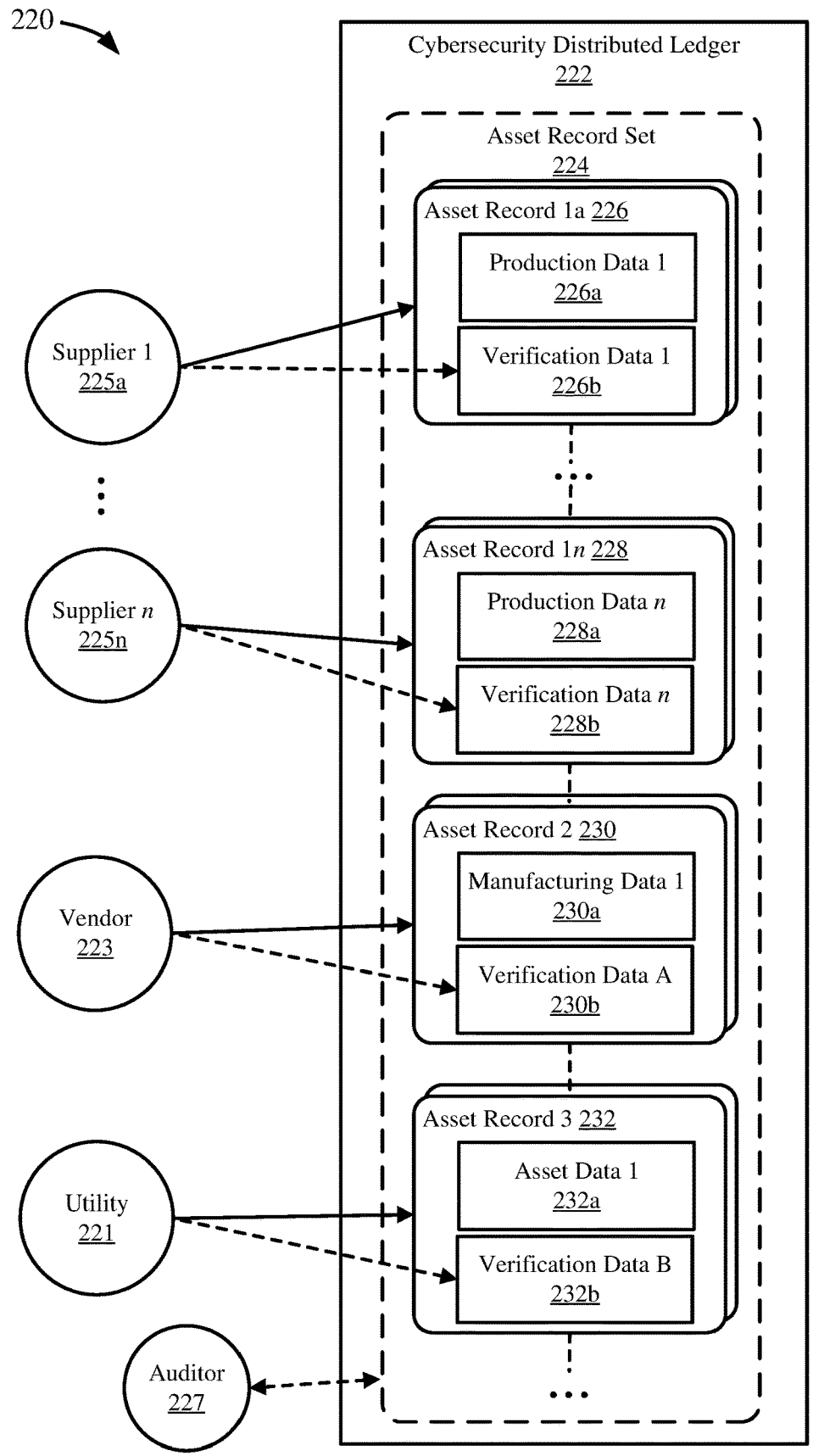
FIG. 2C is a flow diagram depicting a record set generated in a manufacture channel of a cybersecurity distributed ledger.

FIG. 2C is a flow diagram 220 depicting a record set 224 generated in a manufacture channel of a cybersecurity distributed ledger 222, such as similarly described for and shown in FIGS. 2A and 2B. Asset records 226, 228, 230, 232 may be generated by the cybersecurity distributed ledger 222, by or at the request of suppliers 225a-n, vendors 223, and utilities 221, such as similarly described for and shown in FIGS. 2A and 2B, and stored in the cybersecurity distributed ledger 222. The asset records 226, 228, 230, 232 in an asset record set 224 may be linked together, and may be stored sequentially (e.g. such as based on time of insertion, or time of creation/generation) in the asset record set.

Alternatively or additionally, transactions in a given time period may be combined into an asset record 226, 228, 230, 232. Such a combined asset record may be asset record 226 or asset record 228, for example, or may be a combination of asset records generated during the given time period, such as an additional asset record having all asset records (e.g. 226, 228, 230, 232) generated during the given time period.

The asset records 1a-1n 226, 228 may contain production data 1-n 226a, 228a. The production data 1-n 226a, 228a may be transaction data between a supplier 225a-n and a vendor 223, or between a vendor and a utility 221. For example, a supplier may complete production or development of a component of a grid asset, and may generate an asset record 226, 228 in the cybersecurity distributed ledger 222 when the component of the grid asset is provided to the vendor 223. The asset record 226, 228 may correspond to the component of the asset grid manufactured or developed by the supplier 225a-n, and may store production data 226a, 228a for the component. The production data 226a, 228a may include asset identifying information, such as a production or serial number, software or firmware version information, or a software or firmware checksum. The production data 226a, 228a may be specification information for a grid asset or a part of a grid asset, and may include asset functionality or specification data as well, such as operating parameters or data intrinsic to the asset. The production data 226a, 228a may also include production logistics information, such as manner of production, place of production, or a specific maker or producer.

A vendor 223 may also produce one or more asset records containing manufacturing data for an asset, such as asset record 2 230 having manufacturing data 1 230a. The manufacturing data 230a for asset records from a vendor 223 may be similar to the production data 226a, 228a in the supplier asset records 226, 228. Such asset records from a vendor may confirm or aggregate the production data from multiple suppliers in multiple asset records 226, 228. Alternatively or additionally, asset records 230 from a vendor 223 may include additional production-type data, such as a vendor serial number for an asset once assembled from multiple components from the suppliers 225a-n, or software or firmware production-type data from the vendor in addition to the supplier software or firmware production data. The manufacturing data 1 230a from the vendor 223 may include the records 226, 228 with the production data 226a, 228a from the suppliers 225a-n, and so may be an aggregation of records, or a data cluster of data clusters (e.g. a signed data cluster of signed data clusters).

Generally, production data 226a, 228a, 230a includes information to identify or secure a physical layer for the asset, a software/firmware layer for the asset, and a deployment or installation (e.g. grid infrastructure) layer for the asset.

For example, one supplier (e.g. supplier 1 225a) may develop software for operating an asset that is manufactured by a different supplier (e.g. supplier n 225n). Each supplier may generate an asset record (e.g. asset record 1a 226 and asset record 1n 228) for their respective components when the components are provided to the vendor 223. The vendor 223 may confirm the asset records 226, 228 in the cybersecurity distributed ledger 222 upon receipt of the asset components, and may then integrate the software with the hardware. Once the software and hardware components are integrated by the vendor 223, new manufacturing data 230a may be available from the vendor, which in some cases may be different from the production data from each of the components separately or may be additional to the production data from the components (or both). Thus, the vendor 223 may store a new asset record 230 in the cybersecurity distributed ledger 222 with the new production data 230a. This new record 230 may include the production data 226a, 228a for the assets from the various suppliers 225a-n and vendor 223.

A utility 221 may also produce one or more asset records containing asset data, such as asset record 3 232 having asset data 1 232a. The asset data 232a for asset records from a utility 221 may be similar to the production data 226a, 228a or manufacturing data 230a in the supplier asset records 226, 228 or vendor asset records 230. Such asset records from a utility may confirm or aggregate the production data from the multiple suppliers and vendor(s) in multiple asset records 226, 228, 230. Alternatively or additionally, asset records 232 from a utility 221 may include further production data, such as a final serial number or deployment address for an asset once prepared for installation (or installed), or software or firmware production data from the utility in addition to the vendor or supplier software or firmware production data. Generally, asset data 232a may aggregate the total asset-specific and identifying data from the production or development of the asset into a single record, including any additional asset data from the utility 221.

The asset data 1 232a from the utility 221 may include the records 226, 228, 230 with the production data 226a, 228a, or manufacturing data 230a from the vendor 223 and the suppliers 225a-n, and so may be an aggregation of records, or a data cluster of data clusters (e.g. a signed data cluster of signed data clusters, or nested clusters).

One or more asset records 226, 228, 230, 232 may include verification data 226b, 228b, 230b, 232b. Verification data may include testing data confirming the functionality of the asset or component of the asset, or confirming the asset or component meets the request specification or requirements, or confirming the asset or component meets other required standards. In some cases, the verification data 226b, 228b, 230b, 232b may be included in an asset record 226, 228, 230, 232 with production or asset data 226a, 228a, 230a, 232a. In some cases, the verification data 226b, 228b, 230b, 232b may be inserted into the asset record 226, 228, 230, 232 after the record has been generated. In some cases, a separate asset record may be generated for the verification data 226b, 228b, 230b, 232b. A supplier 225a-n, vendor 223, or a utility may generate a record with verification data 226b, 228b, 230b, 232b. Generally, verification data 226b, 228b, 230b, 232b may be from validation or verification of the asset once received in the supply chain (e.g. the utility verifies or validates the asset from the vendor), or when produced or developed (e.g. the supplier verifies or validates once the component is produced). In some cases, the verification data 226b, 228b, 230b, 232b may include testing done after any changes are made by an entity 221, 223, 225a-n once it is received.

The asset records 226, 228, 230, 232 may be cryptographically signed by the entity initiating their generation, e.g. the supplier 225a-n, the vendor 223, or the utility 221, and may contain a timestamp and a hash of the preceding record in the asset record set, thereby linking the records. The asset records 226, 228, 230, 232 may be cryptographically hashed. Generally, the asset records 226, 228, 230, 232 may be blocks in blockchain (e.g. the cybersecurity distributed ledger 222).

The asset record set 224 in the cybersecurity distributed ledger 222 may be accessed and reviewed by an auditor 217, or other third party, at any point in the manufacturing process for the asset or components of the asset.

Example 8—BCAP Maintenance Channel Records

Figure 2D:
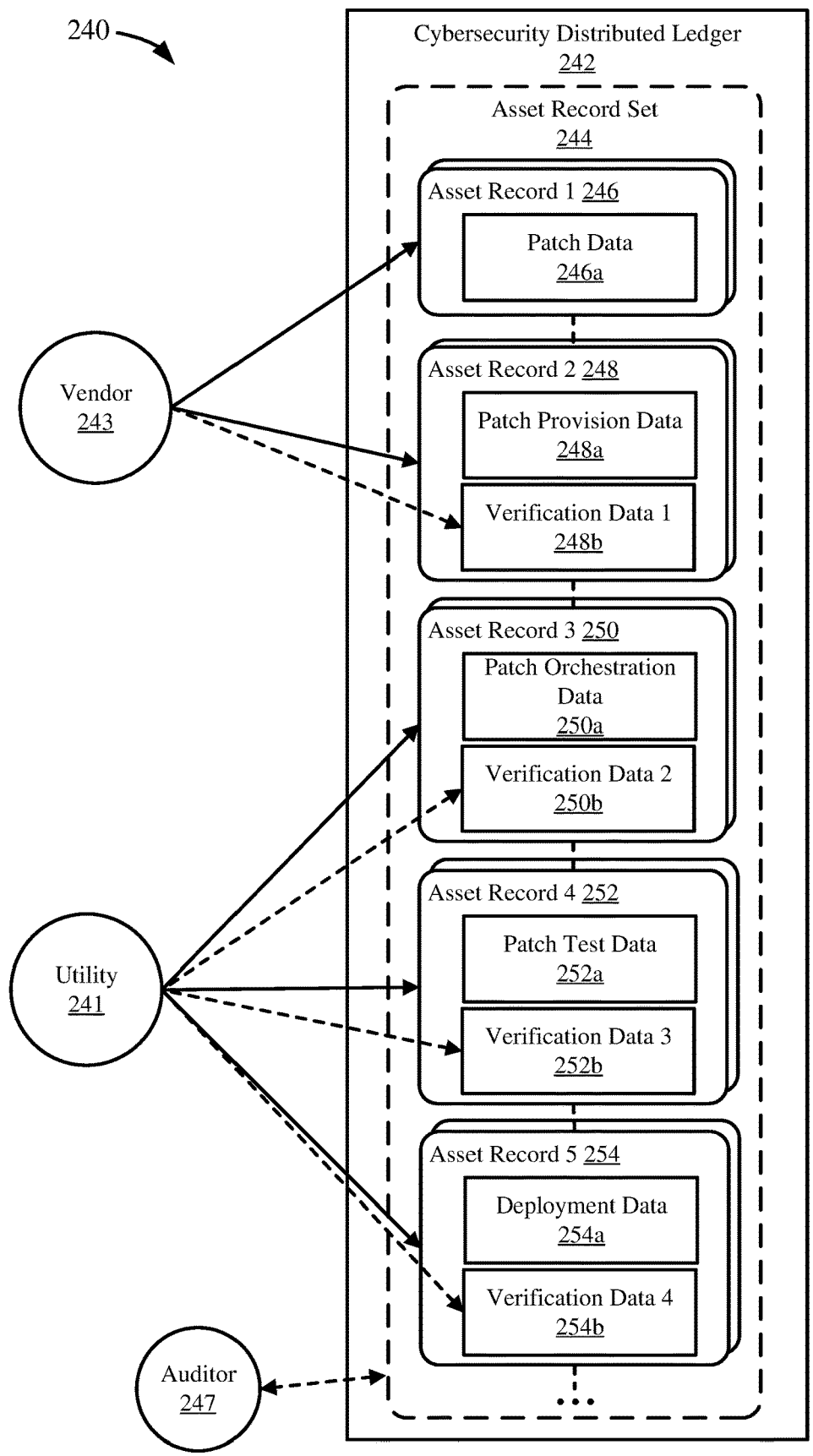
FIG. 2D is a flow diagram depicting a record set generated in a maintenance channel of a cybersecurity distributed ledger.

FIG. 2D is a flow diagram 240 depicting a record set 244 generated in a maintenance channel of a cybersecurity distributed ledger 242, such as similarly described for and shown in FIGS. 2A, 2B, and 2C. Asset records 246, 248, 250, 252, 254 may be generated by the cybersecurity distributed ledger 222, by or at the request of vendors 243 and utilities 241 (and suppliers in some cases), such as similarly described for and shown in FIGS. 2A, 2B, and 2C, and stored in the cybersecurity distributed ledger 242. The asset records 246, 248, 250, 252, 254 in an asset record set 244 may be linked together, and may be stored sequentially (e.g. such as based on time of insertion, or time of creation/ generation) in the asset record set. The asset records 246, 248, 250, 252, 254 may track the steps of a patch (or other update or repair) to a grid asset represented in the cybersecurity distributed ledger 242 by the asset record set 244, from development to deployment.

Alternatively or additionally, transactions in a given time period may be combined into an asset record 246, 248, 250, 252, 254. Such a combined asset record may be asset record 246 or asset record 248, for example, or may be a combination of asset records generated during the given time period, such as an additional asset record having all asset records (e.g. 246, 248, 250, 252, 254) generated during the given time period. For a patch process, asset records regarding a particular patch may be combined together.

An asset record 1 246 may contain patch data 246a. Patch data 246a may be similar to production data, as shown in and described for FIG. 2C, and so may include production data for the patch specifically. Patch data 246a may include information or unique identifier(s) for a patch developed by a vendor 243 (or a supplier), such as a software checksum. For example, a vendor may complete production or development of a patch for a grid asset, and may generate an asset record 246a in the cybersecurity distributed ledger 242 when the patch for the grid asset is ready to send to the utility, or for integration with other components of the grid asset.

An asset record 2 248 may contain patch provision data 248a. Patch provision data 248a may be similar to production data, as shown in and described for FIG. 2C, and so may include production data for an updated hardware component or integration data between a patch and hardware components. Patch provisioning data 248a may include information or unique identifier(s) for a patch developed by a vendor 243 (or a supplier), such as a software checksum, or for an updated or repaired hardware component, such as an additional serial number. For example, a vendor may complete production or development of a repair or update for a hardware component for a grid asset, or may complete integration of a software patch and hardware components, and may generate an asset record 246a in the cybersecurity distributed ledger 242 when the software patch and/or hardware updates for the grid asset is ready to send to the utility, or for integration with other components of the grid asset.

A utility 241 may also produce one or more asset records 250, 252, 254 containing various stages of patch development data, such as asset record 3 250 having patch orchestration data 250a, asset record 4 252 having patch testing data 252a, or asset record 5 254 having patch deployment data 254a. The asset records 250, 252, 254 may chronicle the patch or hardware updates through the maintenance process at a utility 241, from receipt of the patch or update from a vendor 243 to deployment.

Patch orchestration data 250a may include patch data or logistics data for testing and rolling out the patch. For example, the patch orchestration data 250a may include test case information or the testing plan for the patch, and information about testing environments for the patch.

Patch test data 252a may include testing performed, such as test cases, and the testing results, which may include individual test case results or aggregated results. The patch test data 252a may include testing data from testing in a development environment, a test environment, and/or a production or mock-production (pre-production) environment.

Deployment data 254a may include information detailing the actual installation of the patch or update, the logistical deployment plan and information on the results of deployment, and/or deployment information for the patch itself, such as the patch build, version, or checksum information, updated part/component serial number or MAC address, or other location or installation information specific to the grid asset.

One or more asset records 248, 250, 252, 254 may include verification data 248b, 250b, 252b, 254b (and in some cases asset record 1 246 with patch data 546a). Verification data may include testing data confirming the functionality of the asset or component of the asset, or confirming the asset or component meets the requested specification or requirements, or confirming the asset or component meets other required standards (e.g. of the patch or update). In some cases, the verification data 248b, 250b, 252b, 254b may be included in an asset record 248, 250, 252, 254 with patch data, patch provisioning data 248a, patch orchestration data 250a, patch test data 252a, or deployment data 254a. In some cases, the verification data 248b, 250b, 252b, 254b may be inserted into the asset record 248, 250, 252, 254 after the record has been generated. In some cases, a separate asset record may be generated for the verification data 248b, 250b, 252b, 254b. A vendor 223 or a utility 241 (or a supplier in some cases) may generate a record with verification data 248b, 250b, 252b, 254b. Generally, verification data 248b, 250b, 252b, 254b may be from validation or verification of the asset patch or update once received in the supply chain (e.g. the utility verifies or validates the asset patch or update from the vendor), or when produced or developed (e.g. the vendor verifies or validates once the patch or updated component is produced). In some cases, the verification data 248b, 250b, 252b, 254b may include testing done after any changes are made by an entity 241, 243 once it is received.

The asset records 226, 228, 230, 232 may be cryptographically signed by the entity initiating their generation, e.g. the supplier 225a-n, the vendor 223, or the utility 221, and may contain a timestamp and a hash of the preceding record in the asset record set, thereby linking the records. The asset records 226, 228, 230, 232 may be cryptographically hashed. Generally, the asset records 226, 228, 230, 232 may be blocks in blockchain (e.g. the cybersecurity distributed ledger).

The asset record set 244 in the cybersecurity distributed ledger 242 may be accessed and reviewed by an auditor 247, or other third party, at any point in the maintenance process for the asset or components of the asset (e.g. for the patch or updates of the grid asset).

The maintenance process illustrated by the asset records 246, 248, 250, 252, 254 may be repeated for multiple patch or hardware updates, throughout the duration of the life of the grid asset in the energy grid. In some cases, when a grid asset is retired from use in an energy grid (e.g. is fully replaced), an asset record may be created detailing the retirement of the asset and confirming the asset is no longer installed or otherwise used in the energy grid.

Example 9—BCAP Audit Records

Figure 2E:
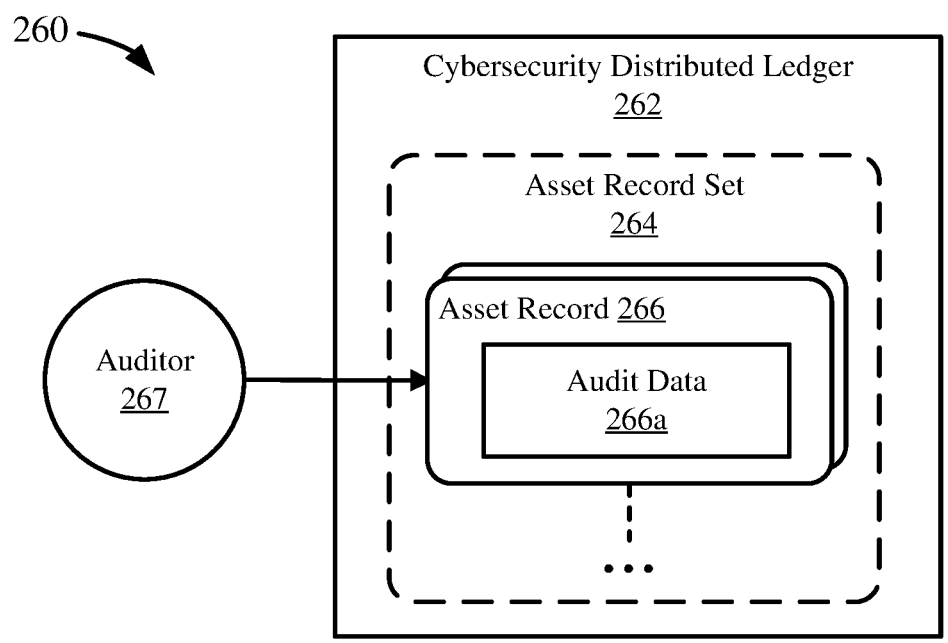
FIG. 2E is a flow diagram depicting an audit record set generated in a cybersecurity distributed ledger.

FIG. 2E is a flow diagram 260 depicting an audit record 266 generated in a cybersecurity distributed ledger 262, such as similarly described for and shown in FIGS. 2A, 2B, 2C, and 2D. An auditor 267 may generate one or more asset records 266 in an asset record set 264 for a grid asset. Such records 266 may be generated in any channel in the cybersecurity distributed ledger 262. Such asset records 266 may have audit data 266a. The audit data 266a may include results of auditing or other regulatory analysis on the asset record set 264 for a grid asset. For example, the audit data 266a may include data on compliance of the grid asset with security or regulatory procedures or required functionality. Audit data 266a may also include configuration data for the grid asset, or control data, and may further include testing or other confirmation of the configuration or control functionality of the grid asset. The audit data 266a may include one or more scores measuring the compliance of the grid asset, and include information on any potential associated compliance violation security levels (VSLs).

Example 10—Grid Asset Record Storage in BCAP

Figure 3A:
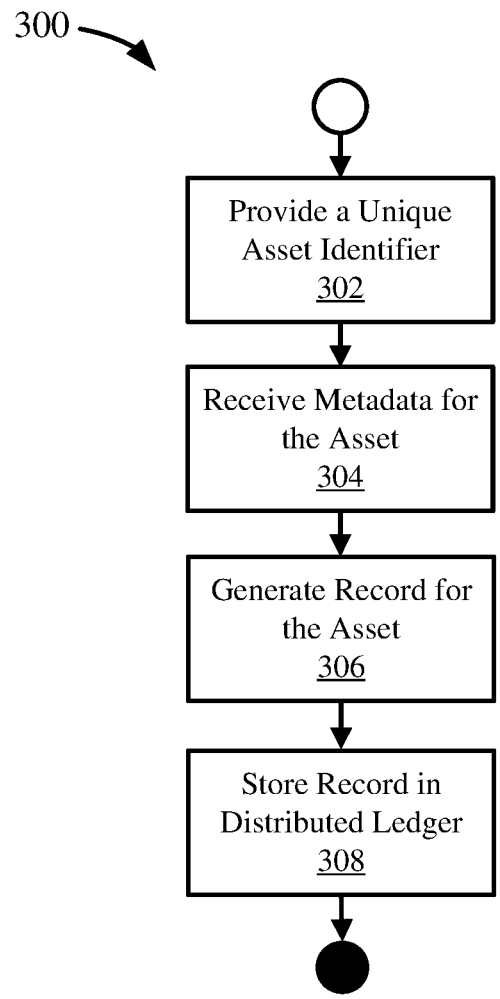
FIG. 3A is a flowchart depicting a process for adding an asset record to an asset record set in a cybersecurity distributed ledger.

FIG. 3A is a flowchart depicting a process 300 for adding an asset record to an asset record set in a cybersecurity distributed ledger. Generally, the process 300 may be similar to a process for adding a block to a blockchain.

A unique asset identifier may be provided at 302. The unique identifier may be provided at 302 via a user interface or via an API or other messaging system. In some cases, providing the unique identifier may include generating the unique identifier, such as for a genesis record in an asset record set. In some embodiments, generating the unique identifier may include requesting a unique identifier from a generation system, such as a QR code generator or other generator for other possible unique identifiers as described herein (e.g. software checksum, MAC address, etc.), and receiving the generated unique identifier (which may then be provided as needed). In some cases, the unique identifier may have been previously provided, and so may not be provided here (e.g. this step may be skipped).

Metadata for an asset may be received at 304. Generally, receiving the metadata for the asset may include receiving the unique identifier for the asset. Metadata for the asset may include the metadata or other asset data, for an asset (such as identified by the unique identifier), describing the asset, the status of the asset, or other aspects of the asset as described herein, such as shown in and described for FIGS. 2A-E. Generally, the metadata received for that asset at 304 may include data for a particular transaction regarding the asset, such as the asset requirements, or details about the production of the asset, such as a serial number or software checksum. The metadata received at 304 may be a signed data cluster having metadata for the asset as described herein.

A record for the asset may be generated at 306. Generating a record at 306 may be similar to adding a block to a blockchain for the asset identified in the metadata received at 304. Generating the record may include identifying a record set for the asset for which the record is being generated. The record generated at 306 may be based at least in part on the metadata received at 304, and may include the metadata received, or a portion of the metadata received. Generating the record may include cryptographically hashing the data included in the record. Generating the record may include obtaining and inserting or including into the record a hash of the previous or preceding record in the asset record set. The record generated at 304 may include data from one or more records preceding the generated record in the asset record set. For example, hashes of previous records may be included in the generated record as a hash tree. The record generated at 306 may be cryptographically signed, such as by the entity providing the metadata received at 304, and may include a timestamp. Generating the record at 306 may include verifying the signature of the metadata, or signed data cluster, received at 304.

In some cases, the signed data cluster having the metadata received at 304 may be a record, similar to a record generated at 306. In such cases, the received record may be generated similar to as described at 306. Further in such cases, the received record may be hashed as part of storing the record at 308.

The record generated at 306 may be stored in the distributed ledger (e.g. BCAP) at 308. Generally, storing the generated record at 308 includes inserting the record into the record set for the asset corresponding to the record. Storing the record at 308 may include executing a consensus function for the cybersecurity distributed ledger to include the record as the next record in the asset record set, or as a next record in the case of multiple new records at a similar point (e.g. multiple bid responses to an asset solicitation, multiple suppliers providing components for an asset, etc.). Generally, the record once stored at 308 is made immutable, and is cryptographically hashed and signed, and associated with the other records in the asset record set for the asset of which the record stores data.

Example 11—Grid Asset Lifecycle Process in BCAP

Figure 3B:
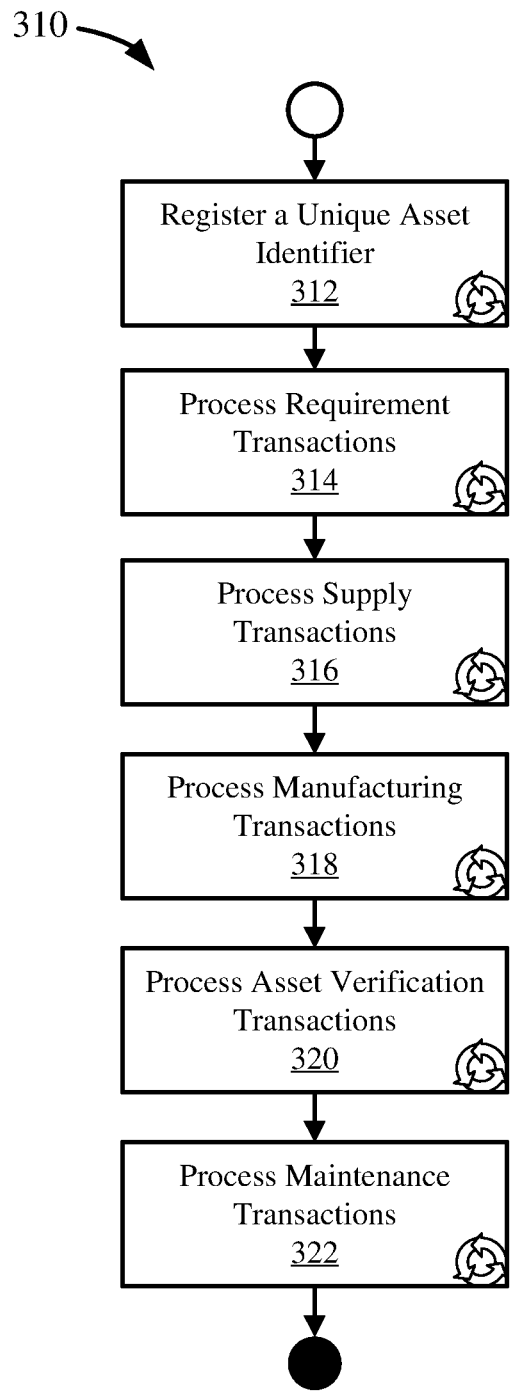
FIG. 3B is a flowchart depicting a process for tracking the lifecycle of an energy grid asset in a cybersecurity distributed ledger.

FIG. 3B is a flowchart depicting a process 310 for tracking the lifecycle of an energy grid asset in a cybersecurity distributed ledger (e.g. the BCAP). Tracking the lifecycle of an asset in a cybersecurity distributed ledger may include tracking the supply chain, including logistics data, of the asset, such as from requirement definition of the asset, through provisioning negotiations, manufacturing and development, to deployment and maintenance, and retirement.

A unique asset identifier may be registered at 312. The unique asset identifier may identify a particular instance of an asset, which may be a hardware asset, software asset, or combination thereof. In some cases, the unique identifier may identify a set of assets having the same requirements or specification, but have multiple instances (e.g. multiple units of a given asset).

Registering the unique identifier at 312 may include creating an asset record set (e.g. a blockchain) in a cybersecurity distributed ledger identified by the unique identifier and corresponding to the asset having the same unique identifier (e.g. thus associating the asset with the asset record set). In some cases, this may include generating a genesis record in the cybersecurity distributed ledger having the unique identifier.

Registering the unique asset identifier at 312 may include generating the unique identifier. In some embodiments, the cybersecurity distributed ledger may generate the unique identifier. In other embodiments, a request may be made to a unique identifier system, such as through an API or messaging system, to provide a unique identifier. For example, a QR code may be generated by QR code software and provided to the process 310 at 312.

Alternatively or additionally, a unique identifier may be received by the process 310 as part of registering the unique identifier at 312. For example, a request to register a new asset may be received at 312, and the request may include the unique identifier. Such a request may be made programmatically, such as through an API, or via a user interface.

Requirement transactions may be processed at 314. A requirement transaction may be a transaction involving requirement data or bid data for an asset, such as shown in and described for FIG. 2A. Generally, such requirement transactions may be transactions in the requirement channel of a cybersecurity distributed ledger as described herein. Processing a requirement transaction at 314 may include the process 300 shown in FIG. 3A using requirement data, requirement bid data, or other smart negotiation data for asset procurement between a utility and one or more vendors. For example, processing a requirement transaction at 314 may include generating a record for an asset, such as via process 300, based at least in part on requirement data received from a utility. Multiple requirement transactions may be processed at 314, in some cases sequentially such as processing a record storing a vendor's response to a utility's bid solicitation having requirement data. However, in some cases requirement transactions may be processed in parallel, such as when multiple vendor responses are received at approximately the same time. Thus, multiple iterations of requirement transactions may be processed at 314. Generally, requirement transactions are processed at 314 during the requirements gathering or vendor selection phase of a grid asset's lifecycle.

Supply transactions may be processed at 316. A supply transaction may be a transaction involving supply requirement data or supply bid data for an asset, such as shown in and described for FIG. 2B. Generally, such supply transactions may be transactions in the supply channel of a cybersecurity distributed ledger as described herein. Processing a supply transaction at 316 may include the process 300 shown in FIG. 3A using supply data, supply bid data, or other smart negotiation data for an asset procurement between a vendor and one or more suppliers. For example, processing a supply transaction at 316 may include generating a record for an asset, such as via process 300, based at least in part on supply data received from a vendor. Multiple supply transactions may be processed at 316, in some cases sequentially such as processing a record storing a supplier's response to a vendor's bid solicitation having requirement data. However, in some cases supply transactions may be processed in parallel, such as when multiple supplier responses are received at approximately the same time. Thus, multiple iterations of supply transactions may be processed at 316. Generally, supply transactions are processed at 316 during the provisioning or supplier selection phase of a grid asset's lifecycle.

Manufacturing transactions may be processed at 318. A manufacturing transaction may be a transaction involving production data, asset data, or verification data for an asset, such as shown in and described for FIG. 2C. Generally, such manufacturing transactions may be transactions in the manufacture channel of a cybersecurity distributed ledger as described herein. Processing a manufacturing transaction at 318 may include the process 300 shown in FIG. 3A using production data, asset data, verification data or other manufacturing or development data for an asset as produced by a vendor or one or more suppliers (including component-specific data for components for an asset). For example, processing a manufacturing transaction at 318 may include generating a record for an asset, such as via process 300, based at least in part on production data received from a vendor or a supplier. Multiple manufacturing transactions may be processed at 318, in some cases sequentially such as processing a record storing production data from a supplier once that supplier has produced the asset component and then storing a record of production data from a vendor as it assembles the asset using the component from the supplier. However, in some cases manufacturing transactions may be processed in parallel, such as when multiple suppliers record production of an asset or component at approximately the same time. Thus, multiple iterations of manufacturing transactions may be processed at 318. Generally, manufacturing transactions are processed at 318 during the production and development phase of a grid asset's lifecycle.

Verification transactions may be processed at 320. A verification transaction may be a transaction involving asset data or verification data for an asset, such as shown in and described for FIG. 2C. Generally, such verification transactions may be transactions in the production channel of a cybersecurity distributed ledger as described herein. Processing a verification transaction at 318 may include the process 300 shown in FIG. 3A using production data and verification data or other manufacturing or development data for an asset as tested and used by a supplier, vendor, or utility. For example, processing a verification transaction at 320 may include generating a record for an asset, such as via process 300, based at least in part on verification of production data compared to requirements for the asset, or compared to the asset itself as received from a vendor or a supplier. Multiple verification transactions may be processed at 320. In some cases, multiple verification transactions may be processed sequentially such as processing a record storing verification data for a component from a supplier by a vendor and then storing a record of verification data from a utility after receiving the asset from the vendor and verifying or otherwise testing it. However, in some cases verification transactions may be processed in parallel, such as when multiple components of an asset (e.g. from multiple suppliers) are verified at approximately the same time (e.g. by a vendor). Thus, multiple iterations of verification transactions may be processed at 320. Verification transactions may be processed at 320 during the manufacturing phase of a grid asset's lifecycle (e.g. during its deployment and use in an energy grid). In some embodiments, verification transactions may be processed in conjunction with manufacturing transactions at 318, and may be part of the same record as a corresponding manufacturing record (e.g. verification of the same asset or component as received from a vendor). In other embodiments, verification may be performed separately, such as by a utility after a vendor sends the asset. In such cases, a separate verification record may be created, or the manufacturing record may be updated to include the verification data.

Maintenance transactions may be processed at 322. A maintenance transaction may be a transaction involving patch data, patch provisioning data, orchestration data, patch test data, patch deployment data, or verification data for an asset, such as shown in and described for FIG. 2D. Generally, such maintenance transactions may be transactions in the maintenance channel of a cybersecurity distributed ledger as described herein. Processing a maintenance transaction at 322 may include the process 300 shown in FIG. 3A using patch data, patch provisioning data, orchestration data, patch test data, patch deployment data, verification data or other maintenance or upkeep data for an asset as used and maintained by a utility or other party responsible for the functioning of the asset in the energy grid. For example, processing a maintenance transaction at 322 may include generating a record for an asset, such as via process 300, based at least in part on patch data received from a vendor or a supplier. Multiple maintenance transactions may be processed at 322. In some cases, multiple maintenance transactions may be processed sequentially such as processing a record storing patch data from a supplier once that supplier has produced the patch and then storing a record of patch provisioning data from a vendor after it has assembled or otherwise prepared the patch for the asset. However, in some cases maintenance transactions may be processed in parallel, such as when multiple suppliers record patches of an asset at approximately the same time. Thus, multiple iterations of maintenance transactions may be processed at 322. Generally, maintenance transactions are processed at 322 during the maintenance phase of a grid asset's lifecycle (e.g. during its deployment and use in an energy grid).

Verification transactions for maintenance transactions may also be processed as part of or in response to the maintenance records, similar to processing verification records at 320.

Example 12—BCAP Cybersecurity Analysis and Auditing

Figure 4:
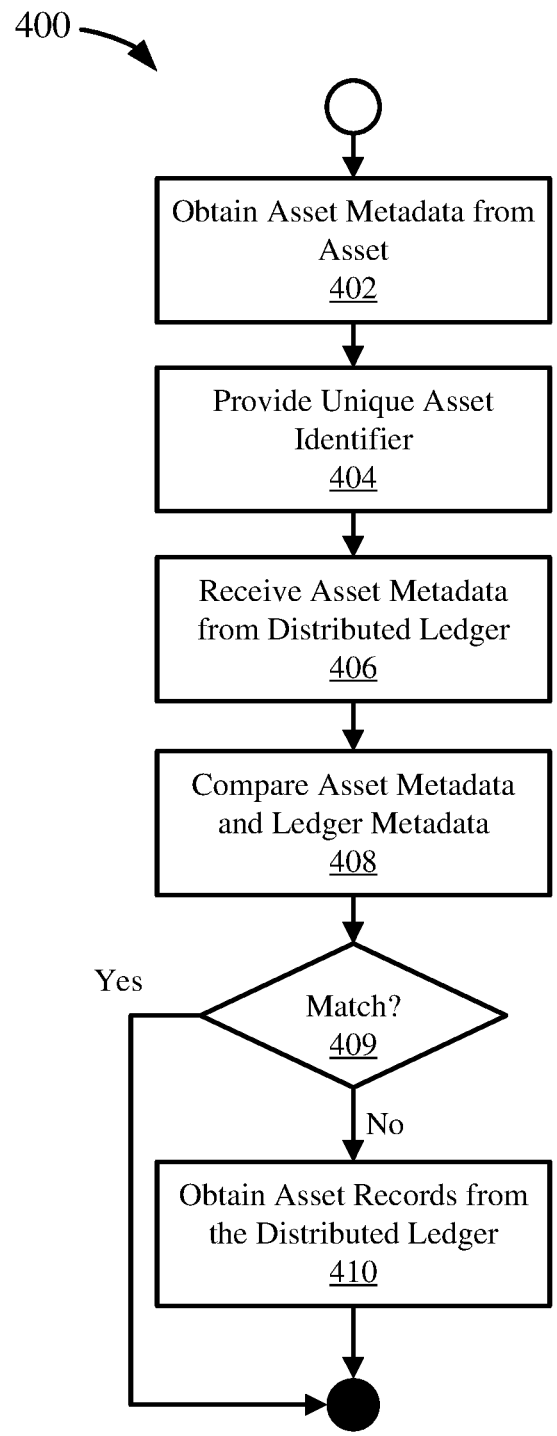
FIG. 4 is a flowchart depicting a process for auditing an asset, which may include detecting a security breach in the asset.

FIG. 4 is a flowchart depicting a process 400 for auditing an asset, which may include detecting a security breach in the asset.

Asset metadata may be obtained from an asset at 402. Obtaining asset metadata may include accessing the asset and retrieving data regarding the current status or nature of the asset. Generally, such asset metadata may be similar to the asset data or metadata previously obtained from the asset and stored in the BCAP as described herein, such as during production of the asset. The asset metadata obtained at 402 may include the unique identifier for the asset, such as a QR code. Other asset metadata obtained may include a serial number, or multiple serial numbers for separate components, of the asset, a checksum or version number for firmware or software of the asset, or a MAC address or other deployment data for the asset.

The unique asset identifier may be provided at 404. Generally, the unique asset identifier may be provided to the BCAP to identify the asset and the correct record set (e.g. blockchain) to access. In some embodiments, the other asset metadata may be provided with the unique identifier to the BCAP.

The metadata for the asset available in the BCAP may be received at 406, based at least in part on the unique identifier provided at 406. Generally, this includes receiving the current record for the asset from the distributed ledger, based at least in part on the provided unique identifier for the asset.

The asset metadata from the asset and the asset metadata from the BCAP may be compared at 408. For example, a software checksum obtained from the asset may be compared against the latest checksum for the software stored in the BCAP. Similarly, the serial number for the asset may be compared against the serial number stored in the BCAP, and so on.

Metadata matching between the asset itself and the BCAP ledger (e.g. "yes" at 409) generally indicates that the asset has not been breached or tampered with, at least regarding the metadata that matches. For example, the same serial numbers on the asset and in the BCAP indicates the component is the same (e.g. "yes" at 409), however, the software checksums may still differ, indicating the software may have been altered or otherwise breached (e.g. "no" at 409).

If metadata between the asset and the BCAP do not match (e.g. "no" at 409), then the asset may be breached or otherwise altered in some way. Additional asset records may be obtained from the BCAP at 410 for further historical analysis of the asset. For example, a software version number may match an earlier record in the BCAP, and may indicate the software was rolled back or altered without recordation in the distributed ledger (such as in an automatic failover process). The further records may also be used to identify potential points of failure in the supply chain where the asset may have been breached, such as the previous entity or entities that had control of the asset (which may be indicated in the records).

In some embodiments, the process 400 may use hash data of a grid asset for auditing the grid asset. For example, a hash of the asset metadata received at 406 (or other asset data) may be computed (e.g. at 406). The hash of the data from the grid asset may then be compared, at 408, to a hash for the grid asset stored in the cybersecurity distributed ledger. Matching hash data (e.g. at 409), between a hash of the grid asset data and the hash stored for the grid asset in the cybersecurity distributed ledger, may indicate asset integrity, while a mismatch may indicate a potential breach, tampering, or some other issue with the asset or the asset records.

In this way, the BCAP may help to identify a breach of an energy grid by providing a detailed record of the assets in the energy grid, against which the assets themselves may be analyzed. Specific or unique aspects or identifiers for an asset that generally may be altered if the asset is altered may be stored in the BCAP and analyzed later, such as serial numbers, versions, or software checksums. Further, utilizing the unique identifier maintained by the BCAP and affixed to or provided in the asset, the analysis of an asset may be quick and efficient, and can even be completed in the field. For example, by scanning a QR code affixed to an asset and providing the QR code to the BCAP through a networked device, the asset can be quickly analyzed against its immutable record and confirmed to be secure, or as a potential breach for which further action is warranted.

The process 400 may be similar to a process for auditing of the asset or the provisioning of the asset. For example, metadata for an asset may be obtained from the BCAP, and then be compared to or reviewed against regulations or other compliance requirements. Such assessments may be made easier, faster, or more comprehensive by maintaining all transactions and metadata for an asset in the BCAP, and then accessing the BCAP during auditing or compliance review. Providing the unique identifier to the BCAP, such as a QR code, can make record retrieval for the asset easy and straightforward. The entire supply chain and life cycle of the asset can be audited, as the BCAP can maintain records of the requirements and supply negotiations and the production and development of the asset, as well as the validation and verification steps taken for the asset, in addition to the asset-specific details stored in the BCAP that can be used to confirm the integrity of the asset before or after deployment.

Example 13—Grid Configuration Management

A cybersecurity distributed ledger (e.g. the BCAP) described herein may also facilitate configuration management of an energy grid or other power infrastructure. The collection of grid asset record sets in a cybersecurity distributed ledger enables utilities to more effectively conduct inventories and oversee cyber assets through complex supply chains and installed infrastructure. Configuration management of an energy grid may be enhanced through the use of a cybersecurity distributed ledger by facilitating automated analysis and assessments of grid asset infrastructure via the cybersecurity distributed ledger, which may detect and assess potential vulnerabilities, such as through available audit records for a grid asset.

Further, baseline configuration information, both for an asset and across multiple assets, may be maintained in the cybersecurity distributed ledger, as well as changes to such configurations, which may be kept in an auditable trail via the blockchain. Such information may also improve the auditing process, by providing an initial configuration baseline for use in auditing.

Example 14—Patch Management in the BCAP

Grid asset maintenance may include patch development. A patch generated by a vendor can be tagged, or otherwise uniquely identified, in the BCAP by the asset vendor along with its release. The asset owner (e.g. the utility) can track and verify the patch based at least in part on its history associated with the tag, in some cases in real-time. Upon verification, the utility can install the patch in the test environment, update the tag with any findings, and identify any issues with the patch. This information can be seen by other nodes on the blockchain, including the asset vendor. Upon obtaining a final stable patch, the utility can install the patch in the production environment.

Further, the patch management process may also be automated using the blockchain. In such a scenario, an individual device can be configured to update a blockchain node and a smart contract can be developed to execute upon identifying a new patch or its tag on the blockchain. In this scenario, the asset's smart contract may be executed to obtain the patch from a secure location; this may be recorded in the blockchain's immutable ledger. Upon unit testing and installation, another update is pushed to the asset's tag. Throughout the patch lifecycle—from its release to the point where all assets are patched—the entire process can be tracked through its tag in the blockchain and can be traced back to any point in its history.

Example 15—Grid Asset Lifecycle with the BCAP Example

Figure 5A:
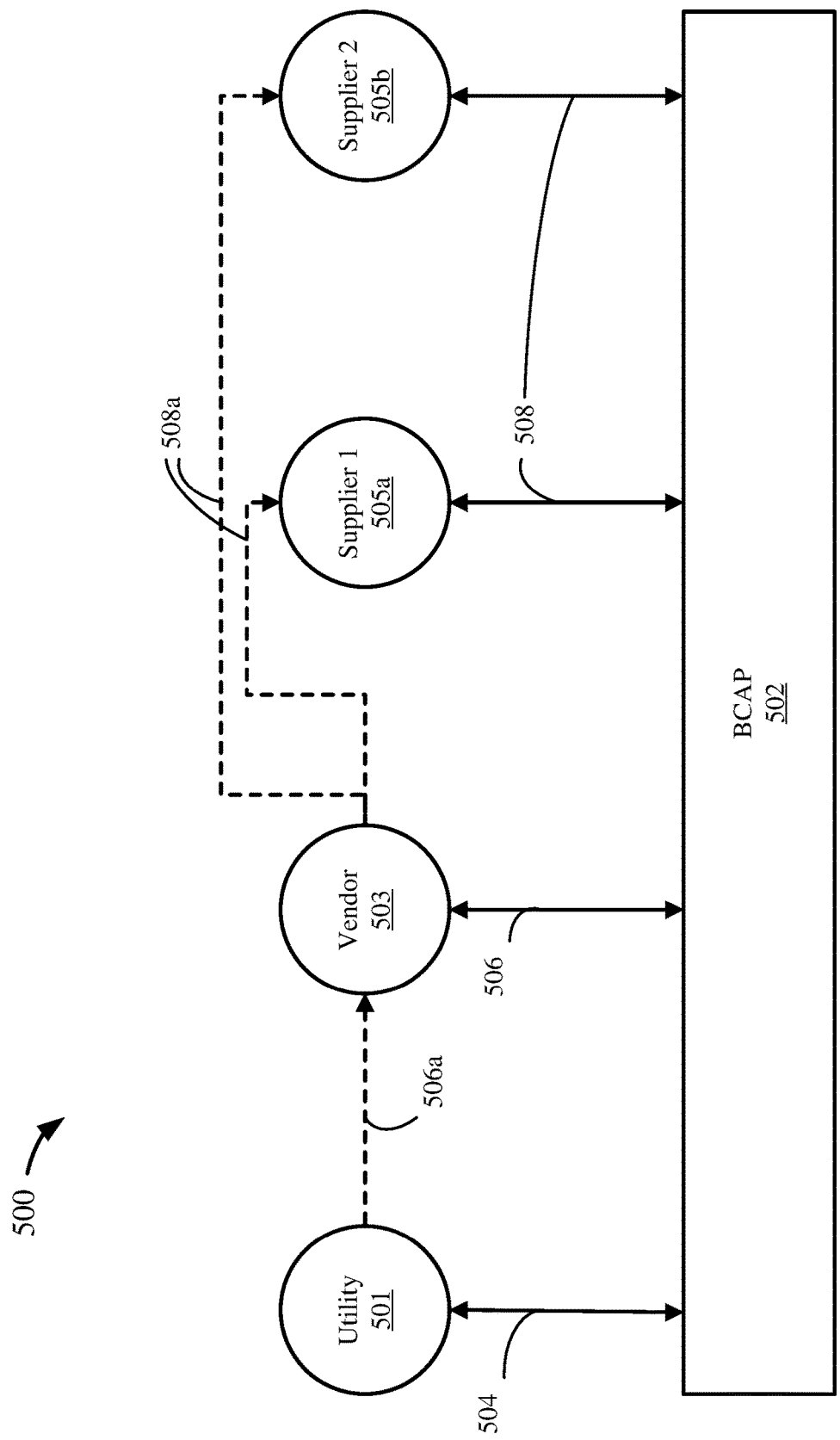
FIGS. 5A-C are diagrams depicting an example grid asset lifecycle process using the BCAP technology.

FIG. 5A is a diagram depicting an example 500 grid asset lifecycle process using the BCAP technology described herein. Generally, FIG. 5A illustrates utilization of the BCAP 502 in a requirements channel and a supply channel, as described herein.

At 504, a utility 501 may articulate the required grid asset, requirements, and specification, such as following the NERC OP 13 guidelines. At 504, the utility may register a unique identifier in the blockchain 502. This unique identifier could be a self-generated QR code that is made of hashed metadata that is cryptographically signed and stored in the blockchain 502. Each QR code is unique and is associated with a desired grid asset. By this process, a cryptographic link is established between the self-generated QR code of the sought grid asset and the unique cryptographic signature. The utility 501 would generate a signed data cluster that encompasses all the information requirements and specifications that provide unique identifier, contextual base information. Such information may include expected receiver, location, time, and any attribute or context that is worth associating with the desired grid asset. The data is immutably bound along with the identity of the entity that created the signed data cluster and registered the physical component. Finally, the signed data cluster will be signed with a unique signature that will be published in an immutable signed ledger 502. Throughout the manufacturing cycle and post-deployment phase, all entities such as the utility 501, vendor 503, suppliers 505a-b, and auditors can simply scan the QR code to get grid asset lifecycle information.

At 506, the signed data cluster is sent 506a to the vendor 503. Because of the immutability and portability associated with the signed data clusters and because the signed data clusters are signed by unique signatures, any attempts to tamper or alter can be detected. This enables a more secure and agile exchange and distribution of critical cyber assets. Finally, the signed data cluster sent by the customer is received 506a by the vendor 503. The vendor 503 would initiate the asset development process and appends the information to the customer-generated QR code. Then, the vendor 503 identifies suppliers 505a-b to loop-in for firmware, software, and other principle components requirements. The vendor 503 then sends the updated signed data cluster to suppliers and associated with the same QR code; such updates may generally be included in the blockchain 502.

At 508, the suppliers 505a-b may receive the known registered assets represented by signed data clusters 508a. Suppliers 505a-b may use this information to verify the crucial cyber assets (e.g. ICS, EDS, etc.) received from the prime vendor 503. After validating and interrogating the signed data cluster for policy input with complete trust, the suppliers 505a-b need not login to any third-party or enterprise service to see any attributes of the signed data cluster. Note that some of the attributes were set by the utility 501 and may have been updated by the prime vendor 503. Therefore, the suppliers 505a-b can perform independent verification for authenticity and accuracy using the information within the signed data cluster. Once the suppliers 505a-b verify the unique signature associated with the signed data cluster, the information associated with the QR code (e.g. from 504) and its attributes is leveraged. Then, the suppliers 505a-b may create a new record to incorporate the received signed data cluster and may sign this new signed data cluster with new unique signature with the updated information and the previous signed data clusters. This is a state of "cluster-of-clusters" or "nested clusters" where the new signed data cluster contains additional information and encapsulates the previous signed data clusters. At this point, if any permitted entity attempts to verify the signed data cluster, it will clearly show the change of ownership as each supplier 505a-b is individually credentialed with respect to the blockchain 502.

Figure 5B:
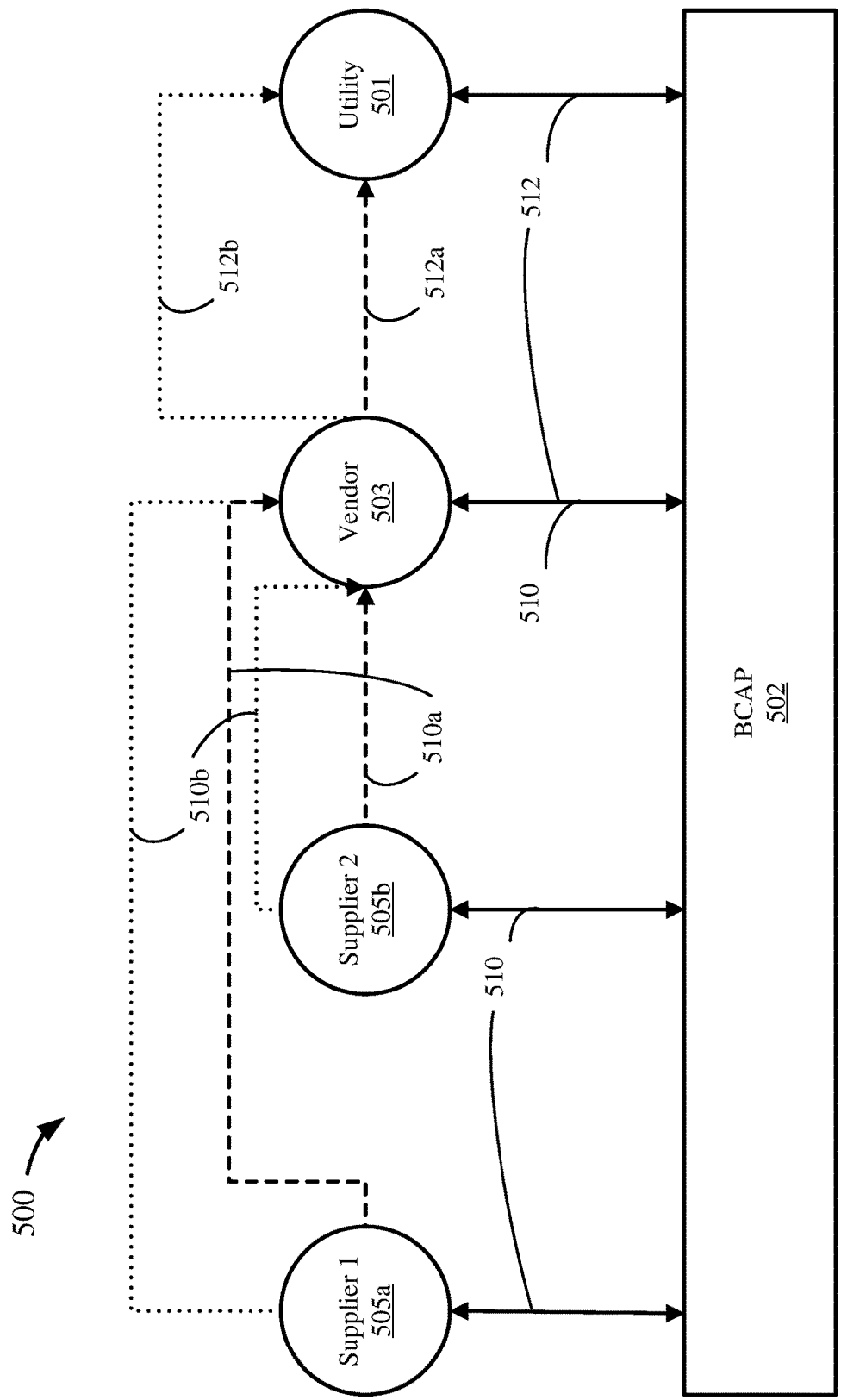

FIG. 5B is a diagram depicting a continuation of the example 500 grid asset lifecycle process using the BCAP technology described herein. Generally, FIG. 5B illustrates utilization of the BCAP 502 in a manufacture channel, as described herein.

At 510, the new signed data cluster 510a along with associated manufactured systems (e.g. components for a grid asset) 510b are sent from the suppliers 505a-b to the prime vendor 503. The vendor 503 integrates the newly received components 510b and integrates them in the grid asset development process. In this process, the vendor 503 updates the signed data cluster (e.g. creates a new signed data cluster) with all previous signed data clusters as part of it and finally, signs it with a new unique signature (similar process as at 508) in the BCAP 502.

At 512, final steps of grid asset procurement may be performed. The signed data cluster is updated with all the information associated with the physical (or digital) grid asset. The signed data cluster may contain information per NERC CIP 13 requirements. Finally, the grid asset is sent 512b to the utility 501, as well as the signed data clusters 512a. The utility 501, at any given time, can independently verify the information associated with the grid asset and its authenticity all the way to the principle component level through the signed data clusters. The utility 501 may choose to create a new signed data cluster that holds all the previous signed data clusters with other information such as downstream connections, etc. This signed data cluster can be used by NERC for auditing purposes and standard compliance checks.

Figure 5C:
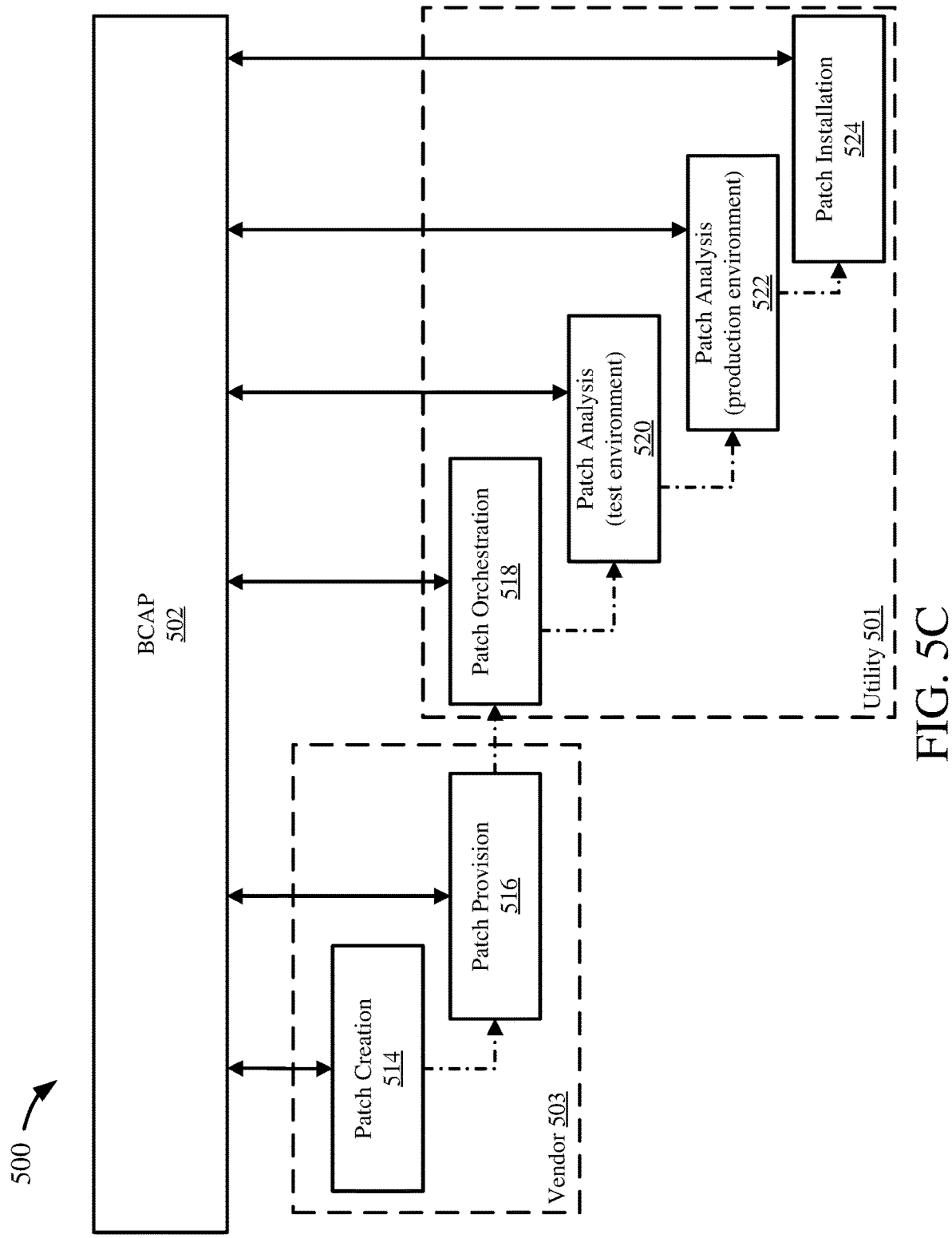

FIG. 5C is a diagram depicting a continuation of the example 500 grid asset lifecycle process using the BCAP technology described herein. Generally, FIG. 5C illustrates utilization of the BCAP 502 in a maintenance channel, as described herein.

The vendor (or suppliers, in some cases) 503 may begin the process of patch creation at 514. Along with the initiation of the patch or maintenance process at 514, the vendor 503 may also create a unique identifier tag (such as a QR code or RFID) and register the cryptographically signed unique identifier tag with the blockchain 502. Therefore, a cryptographic link is established between the unique identifier tag and the patch. The unique identifier tag stays as a constant tag through the patch's life cycle and by scanning it, the asset vendor 503 and asset owners 501 can be connected to the virtual profile of the asset in the blockchain 502 associated with the tag. The virtual profile (e.g. asset records in the blockchain 502) holds the entire history associated with the patch development, testing, analysis, and integration processes. All the updates and development done towards patch creation may be pushed to the virtual profile in the blockchain 502 associated with the identifier tag.

Irrespective of whether the patch is developed under a single facility or is being developed in a multi-partner collaborative environment, there may still be a possibility for the patch to be corrupted by an attacker. Therefore, during the patch provision or release phase at 516, the vendor's 503 release team may first verify the integrity of the patch. Upon verification, validation, and testing, for which records may be stored in the blockchain 502, the patch may be released to the asset owner 501. Generally, the patch along with the signed digital clusters associated with the patch may be provided to the utility 501.

The utility (e.g. asset owner) 501 may perform patch orchestration at 518. Patch orchestration at 518 may include the performing some patch automation and coordination services that may not be common across various asset owners 501 or vendors 503. The vendor 501 may first verify the patch based at least in part on the history recorded in its virtual profile in the blockchain 502. Since the utility 501 is another permitted node in the blockchain 502, the utility may be able to scan the QR code and retrieve the immutable virtual profile or record set. Upon verification, patch orchestration may be performed, and the utility 501 may update the blockchain 502 with findings, the current state, and any other relevant information about the patch.

The patch may then be verified and installed in a test environment at 520. This may be done manually by a tester team or can be automated. Under automation, a smart contract can be executed in the blockchain 502 upon the availability of a new patch, or other software, item on the blockchain 502. The smart contract may initiate the verification procedures. Upon verification, it may invoke a system level application that can take the patch and install it in the test environment. Upon validating the patch in the test environment, another native application may combine all of the findings and analysis reports. This new data can be transferred to the patch's virtual profile in the blockchain 502 through another smart contract. If the validation fails, the asset vendor 503 may then be able to immediately know the details of the failure through the virtual profile 502. Therefore, since the asset vendor 503 and utility 501 are active blockchain nodes, securing and updating the patch can be performed in an autonomous fashion.

Patch analysis at 522 is very similar to patch analysis at 520, but is performed in a production environment, or a mock production environment. Through the validation processes at 522, if an associated system is observed to be impacted, the patching process may be halted and reverted to the previous stable version. This information is sent to the virtual profile in the blockchain 502, which can be used by the vendor 503 to design a fix.

The patch may be pushed to all relevant systems, or otherwise deployed or installed, at 524. Patch installation at 524 may include updating the blockchain 502 (e.g. the virtual profile of the grid asset) with the installation or other deployment data. Upon any hurdles, the virtual profile in the blockchain 502 may be updated, and the vendor 503 may be notified.

Example 16—BCAP Module Environments

Figure 6A:
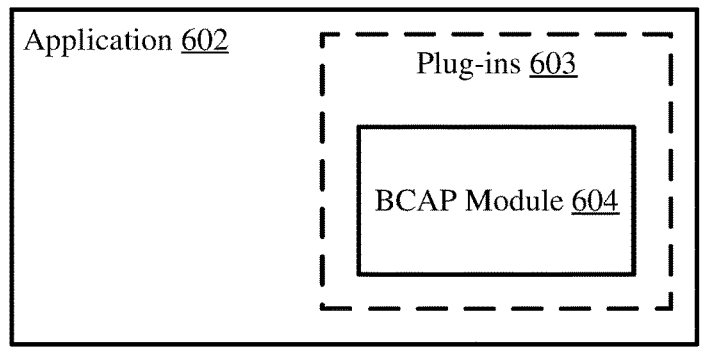
FIG. 6A is a schematic diagram depicting an application environment for a BCAP module.

FIG. 6A is a schematic diagram depicting an application environment for a BCAP module 604, which may provide electrical grid cybersecurity and distributed ledger/blockchain functionality as described herein. An application 602, such as a software application running in a computing environment, may have one or more plug-ins 603 (or add-ins or other software extensions to programs) that add functionality to, or otherwise enhance, the application. The BCAP module 604 may be integrated with the application 602; for example, the BCAP module may be integrated as a plug-in. The BCAP module 604 may add functionality to the application 602 for electrical grid cybersecurity and blockchain, which may be displayed in a user interface or otherwise provided to a user. For example, the application 602 may be a database or distributed ledger application, or a transaction or compliance tracking application, and the BCAP module 604 may be integrated with the ledger or tracking application to provide electrical grid cybersecurity and distributed ledger/blockchain functionality.

Figure 6B:
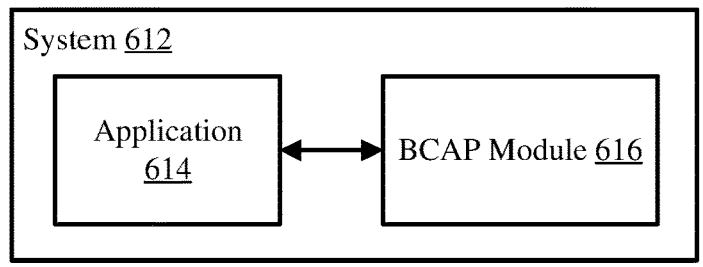
FIG. 6B is a schematic diagram depicting a system environment for a BCAP module.

FIG. 6B is a schematic diagram depicting a system environment for a BCAP module 616, which may provide electrical grid cybersecurity and distributed ledger/blockchain functionality as described herein. The BCAP module 616 may be integrated with a computer system 612. The computer system 612 may include an operating system, or otherwise be a software platform, and the BCAP module 616 may be an application or service running in the operating system or platform, or the BCAP module may be integrated within the operating system or platform as a service or functionality provided through the operating system or platform. The system 612 may be a server or other networked computer or file system. Additionally or alternatively, the BCAP module 616 may communicate with and provide electrical grid cybersecurity and distributed ledger/blockchain functionality, as described herein, to one or more applications 614, such as a database, distributed ledger, or audit or compliance tracking applications, in the system 612.

Figure 6C:
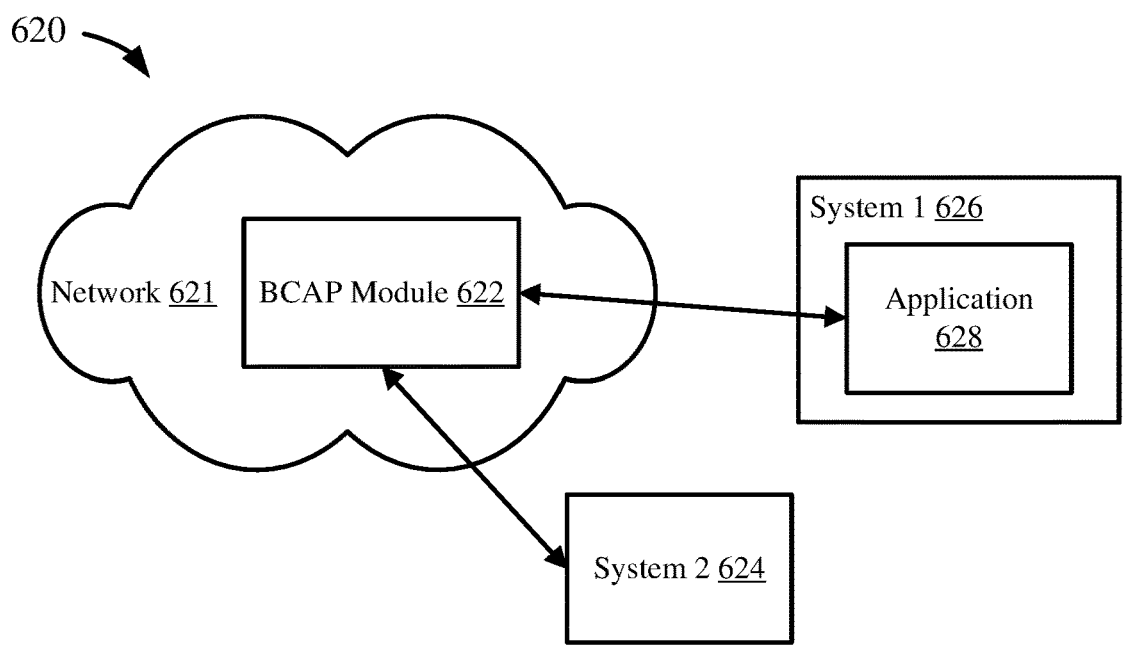
FIG. 6C is a schematic diagram depicting a network environment for a BCAP module.

FIG. 6C is a schematic diagram depicting a network environment 620 for a BCAP module 622, which may provide electrical grid cybersecurity and distributed ledger/blockchain functionality as described herein. The BCAP module 622 may be available on a network 621, or integrated with a system (such as from FIG. 6B) on a network. Such a network 621 may be a cloud network or a local network. The BCAP module 622 may be available as a service to other systems on the network 621 or that have access to the network (e.g., may be on-demand software or SaaS). For example, system 2 624 may be part of, or have access to, the network 621, and so can utilize electrical grid cybersecurity and distributed ledger/blockchain functionality from the BCAP module 622. Additionally, system 1 626, which may be part of or have access to the network 621, may have one or more applications, such as application 628, that may utilize electrical grid cybersecurity and distributed ledger/blockchain functionality from the BCAP module 622.

In these ways, the BCAP module 604, 616, 622 may be integrated into an application, a system, or a network, to provide electrical grid cybersecurity and distributed ledger/blockchain functionality as described herein.

Example 17—Computing Systems

Figure 7:
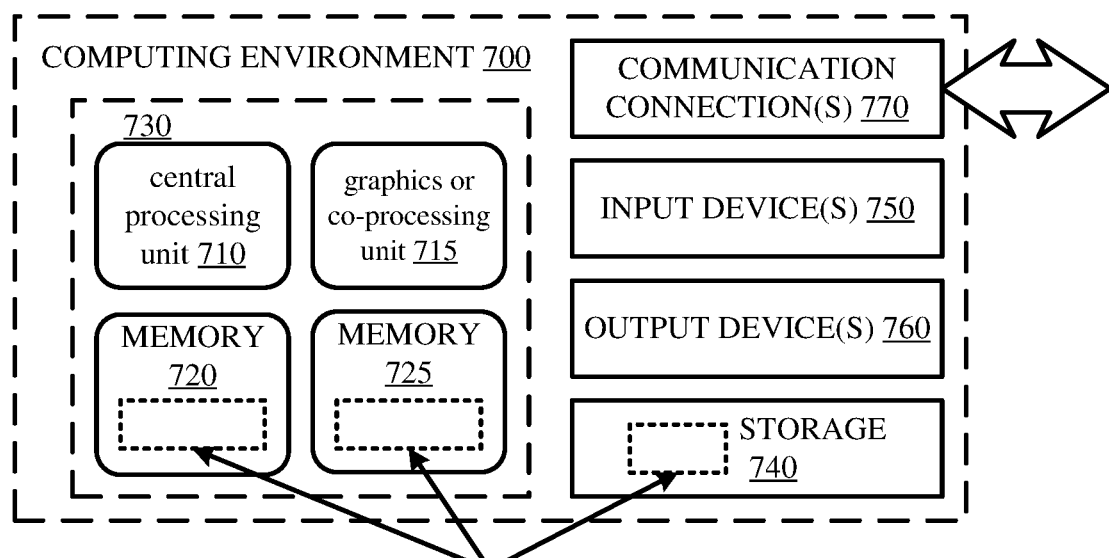
FIG. 7 is a diagram of an example computing system in which described embodiments can be implemented.

FIG. 7 depicts a generalized example of a suitable computing system 700 in which the described innovations may be implemented. The computing system 700 is not intended to suggest any limitation as to scope of use or functionality of the present disclosure, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing components of the processes of FIGS. 3A-B and 4, the systems of FIGS. 1A-C and 6A-C, or the blockchains, databases, data representations, and examples of FIGS. 2A-E and 5A-C. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715. The memory 720, 725, may also store settings or settings characteristics, databases, data sets, blockchain, examples, or representations shown in FIGS. 2A-E and 5A-C, systems shown in FIGS. 1A-C and 6A-C, or the steps of the processes shown in FIGS. 3A-B and 4.

A computing system 700 may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 1000. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 18—Cloud Computing Environment

Figure 8:
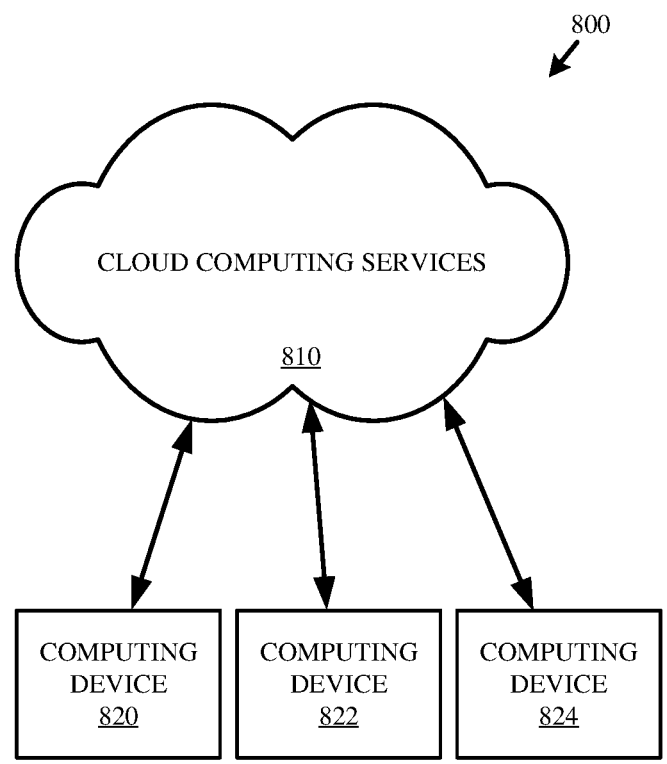
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

Example 19—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

Example 20—Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented by one or more computing devices comprising at least one hardware processor and one or more tangible memories coupled to the at least one hardware processor, of securing an electrical grid asset, the method comprising:
providing, from a distributed ledger, a first record comprising a unique identifier for the electrical grid asset and/or a hash value based at least in part on the unique identifier, wherein the unique identifier is based at least in part on metadata defining the electrical grid asset, the first record further comprising a first cryptographically-signed data cluster;
receiving a second cryptographically-signed data cluster comprising additional metadata describing the electrical grid asset and/or status of the electrical grid asset;
confirming the second cryptographically-signed data cluster;
determining a hash of the first record; and
storing a second record in the distributed ledger in association with the first record, the second record containing the hash of the first record as a link to the first record, the second record further containing the second cryptographically-signed data cluster and the first cryptographically-signed data cluster, wherein the second record encapsulates the second cryptographically-signed data cluster and the first cryptographically-signed data cluster.

2. The method of claim 1, wherein the distributed ledger is implemented using a blockchain.

3. The method of claim 1, further comprising:
generating the unique identifier for the electrical grid asset;
generating the first record; and
storing the first record in the distributed ledger, the first record containing the first cryptographically-signed data cluster.

4. The method of claim 1, wherein the confirming comprises:
validating the source of the second cryptographically-signed data cluster; and/or
executing a consensus algorithm to obtain approval to store the second cryptographically-signed data cluster in the distributed ledger.

5. The method of claim 1, further comprising:
receiving the unique identifier and asset data of the electrical grid asset;

accessing one or more stored records of the electrical grid asset based at least in part on the unique identifier;

comparing cryptographically-signed data contained by the one or more accessed records to the asset data; and returning a result of the comparison between the asset data from the electrical grid asset and cryptographically-signed data contained by the one or more accessed records.

6. The method of claim 1, wherein the second cryptographically-signed data cluster is a nested cluster containing the first cryptographically-signed data cluster.

7. One or more non-transitory computer-readable storage media storing computer-executable instructions for causing a computing system to perform a method of securely updating an electrical grid asset, the method comprising:

providing a signed cryptographically-secured current data cluster comprising a unique identifier for the electrical grid asset and/or a hash value based at least in part on the unique identifier, the signed cryptographically-secured data cluster further comprising asset version data;

receiving a signed cryptographically-secured updated data cluster comprising the unique identifier for the electrical grid asset and/or the hash value, the signed cryptographically-secured updated data cluster further comprising updated asset version data, wherein the updated asset version data comprises patch data of a software patch of the electrical grid asset, the patch data comprising a software checksum for the software patch of the electrical grid asset;

confirming the signed cryptographically-secured updated data cluster; and inserting, as part of a new record, the signed cryptographically-secured updated data cluster into a distributed ledger having the signed cryptographically-secured current data cluster wherein the inserting the signed cryptographically-secured updated data cluster comprises:

hashing a preceding record that contains the signed cryptographically-secured current data cluster; and storing the new record in the distributed ledger, the new record containing the signed cryptographically-secured updated data cluster and the signed cryptographically-secured current data cluster.

8. The one or more non-transitory computer-readable storage media of claim 7, wherein the confirming comprises validating the source of the signed cryptographically-secured updated data cluster.

9. A system for electrical grid security, the system comprising:

one or more memories;

one or more processing units coupled to the one or more memories; and one or more computer-readable storage media storing instructions that, when loaded into the one or more memories, cause the one or more processing units to perform distributed ledger operations comprising:

registering a unique identifier for an electrical grid asset in a distributed ledger;

generating a first asset record, wherein the first asset record comprises the unique identifier and/or a hash value based at least in part on the unique identifier, and wherein the first asset record further comprises a description of the electrical grid asset;

storing the first asset record in an asset record chain in the distributed ledger;

receiving production data for the electrical grid asset;

generating a second asset record based at least in part on the unique identifier and the production data;

storing the second asset record in the asset record chain in the distributed ledger;

receiving manufacturing data for the electrical grid asset;

generating a third asset record based at least in part on the unique identifier and the manufacturing data;

storing the third asset record in the asset record chain in the distributed ledger;

generating a fourth asset record based at least in part on the unique identifier and an aggregation of the description of the electrical grid asset, the production data, and the manufacturing data, the fourth asset record containing the aggregation of the description of the electrical grid asset, the production data, and the manufacturing data; and storing the fourth asset record in the asset record chain in the distributed ledger.

10. The system of claim 9, wherein the distributed ledger comprises a permissioned blockchain.

11. The system of claim 9, wherein registering the unique identifier comprises receiving the unique identifier.

12. The system of claim 9, wherein registering the unique identifier comprises generating the unique identifier.

13. The system of claim 9, wherein the description of the electrical grid asset comprises an asset name, an asset type, one or more asset requirements, and/or an asset functional specification.

14. The system of claim 9, wherein the production data comprises data for a component of the electrical grid asset.

15. The system of claim 9, wherein the manufacturing data comprises a serial number, a part number, a software version, a software checksum, and/or a model number.

16. The system of claim 9, the distributed ledger operations further comprising:

receiving verification data for the electrical grid asset;

generating a fifth asset record in the asset record chain based at least in part on the unique identifier and the verification data; and storing the fifth asset record in the asset record chain in the distributed ledger.

17. The system of claim 16, wherein verification data comprises asset testing information.

18. The system of claim 9, the distributed ledger operations further comprising:

receiving audit data for the electrical grid asset;

generating a sixth asset record in the asset record chain based at least in part on the unique identifier and the audit data; and storing the sixth asset record in the asset record chain in the distributed ledger.

19. The system of claim 18, wherein the audit data comprises a violation security level.

* * * * *